United States Patent [19]
Kantor et al.

[11] Patent Number: 6,025,871
[45] Date of Patent: Feb. 15, 2000

[54] USER INTERFACE FOR A VIDEO CONFERENCING SYSTEM

[75] Inventors: Brian L. Kantor, Portland; Christopher C. Lawless, Forest Grove; Puneet Kukkal, Portland; Rune Skarbo, Hillsboro, all of Oreg.

[73] Assignee: Intel Corporation, Santa Clara, Calif.

[21] Appl. No.: 09/223,849

[22] Filed: Dec. 31, 1998

[51] Int. Cl.[7] ...................................................... H04N 7/14
[52] U.S. Cl. ............................ 348/15; 348/14; 379/93.21
[58] Field of Search .................... 348/14, 15; 379/93.17, 379/93.21; 345/1, 330, 329, 327, 346, 331, 332; 370/260; H04N 7/14

[56] References Cited

U.S. PATENT DOCUMENTS 5,689,641  11/1997  Ludwig et al. ............................ 348/15

FOREIGN PATENT DOCUMENTS

000645932A1  3/1995  European Pat. Off. ......... H04N 7/15

*Primary Examiner*—Paul Loomis
*Assistant Examiner*—Melur Ramakrishnaiah
*Attorney, Agent, or Firm*—Schwegman, Lundberg, Woessner & Kluth P.A.

[57]  ABSTRACT

Method and apparatus for video conferencing provides for automatically managing user views to provide ready, video only, full screen video, video with document not shared, and video with shared document views. Several different automatically managed user-interfaces for a dual monitor system provide, among other things, that the second monitor can be used for local video image only, used for all functions except shared applications, or to display shared applications.

21 Claims, 33 Drawing Sheets

USER INTERFACE FOR A VIDEO CONFERENCING SYSTEM

TECHNICAL FIELD OF THE INVENTION

The present invention relates to the field of telecommunications. More particularly, the present invention relates to video conferencing.

BACKGROUND OF THE INVENTION

Video conferencing has become increasingly popular as the availability of conferencing equipment has grown and the cost of carrying the audiovisual data has dropped. Despite its relative wide availability, however, conferencing equipment remains, relative to a telephone, difficult to operate for the casual user. This relative complexity continues to be a deterrent to even wider use of video conferencing.

SUMMARY OF THE INVENTION

The present invention provides method and apparatus for displaying video in a dual monitor video conferencing system. According to one example embodiment, remote end video is displayed in a first monitor during all modes of operation, while near end video and shared applications are displayed in a second monitor.

According to another example embodiment, remote end video is displayed in a first monitor and the near end video is displayed in a second monitor, and in another mode of operation, near end and far end video are displayed in the second monitor, and shared applications in the first monitor.

According to still another example embodiment, near end, remote end, and control options are displayed in a first monitor during all modes of operation, while shared applications are displayed in the second monitor.

DETAILED DESCRIPTION OF THE INVENTION

In the following detailed description of the preferred embodiments, reference is made to the accompanying drawings that form a part hereof, and in which are shown by way of illustration specific embodiments in which the invention may be practiced. It is understood that other embodiments may be utilized and structural changes may be made without departing from the scope of the present invention.

Figure 1:
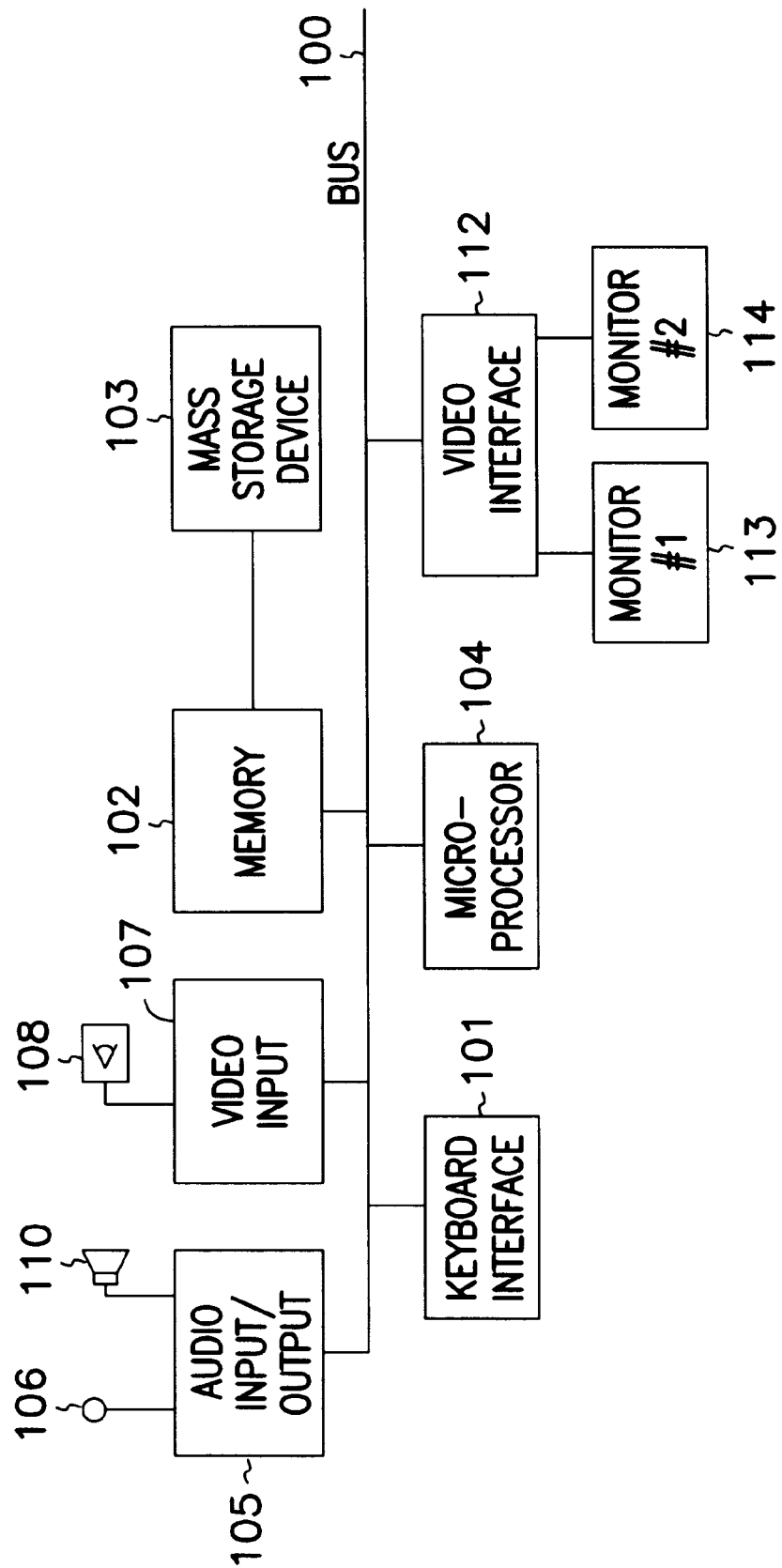
FIG. 1 illustrates in block diagram form an example embodiment of a computer system adapted for video conferencing according the present invention.

Referring now to FIG. 1, there is illustrated in block diagram form a computer system of one embodiment of the present invention. The computer system comprises bus 100, keyboard interface 101, external memory 102, mass storage device 103 and processor 104. Bus 100 can be a single bus or a combination of multiple buses, and provides communication links between components in the computer system. Keyboard controller 101 can be a dedicated device or can reside in another device such as a bus controller or other controller. Keyboard controller 101 allows coupling of a keyboard to the computer system and transmits signals from a keyboard to the computer system. External memory 102 can comprise a dynamic random access memory (DRAM) device, a static random access memory (SRAM) device, or other memory devices. External memory 102 stores information from mass storage device 103 and processor 104 for use by processor 104. Mass storage device 103 can be a hard disk drive, a floppy disk drive, a CD-ROM device, or a flash memory device. Mass storage device 104 provides information to external memory 102. Processor 104 can be a microprocessor and is capable of decoding and executing a computer program such as an application program or operating system. An audio input/output device 105 is also provided, and includes a microphone 106 and speaker 110 to receive sound in the environment of the system and convert it to a digital form that can be processed by the system, and in particular processor 104. In addition, the computer system includes a video input device 107, and includes a video camera 108 that is positioned to view a visual field proximate the computer system. Video input device outputs a digital video signal that can be processed by processor 104, as described below. Also included is a video interface 112 for driving monitor 113 and, optionally, a second monitor 114.

The present invention provides a user interface for a video conferencing system, and in particular a video conferencing system configured on a host system, such as a personal computer or workstation platform as described above, which may, for example, take the form of an IBM-compatible computer executing the Microsoft®, Windows® 95, Windows® 98, or Windows® NT operating system. According to one example embodiment, the video conferencing system takes the form of a Microsoft®, Windows® application executing on a platform such as that of FIG. 1 configured with the Windows® operating system.

Figure 2:
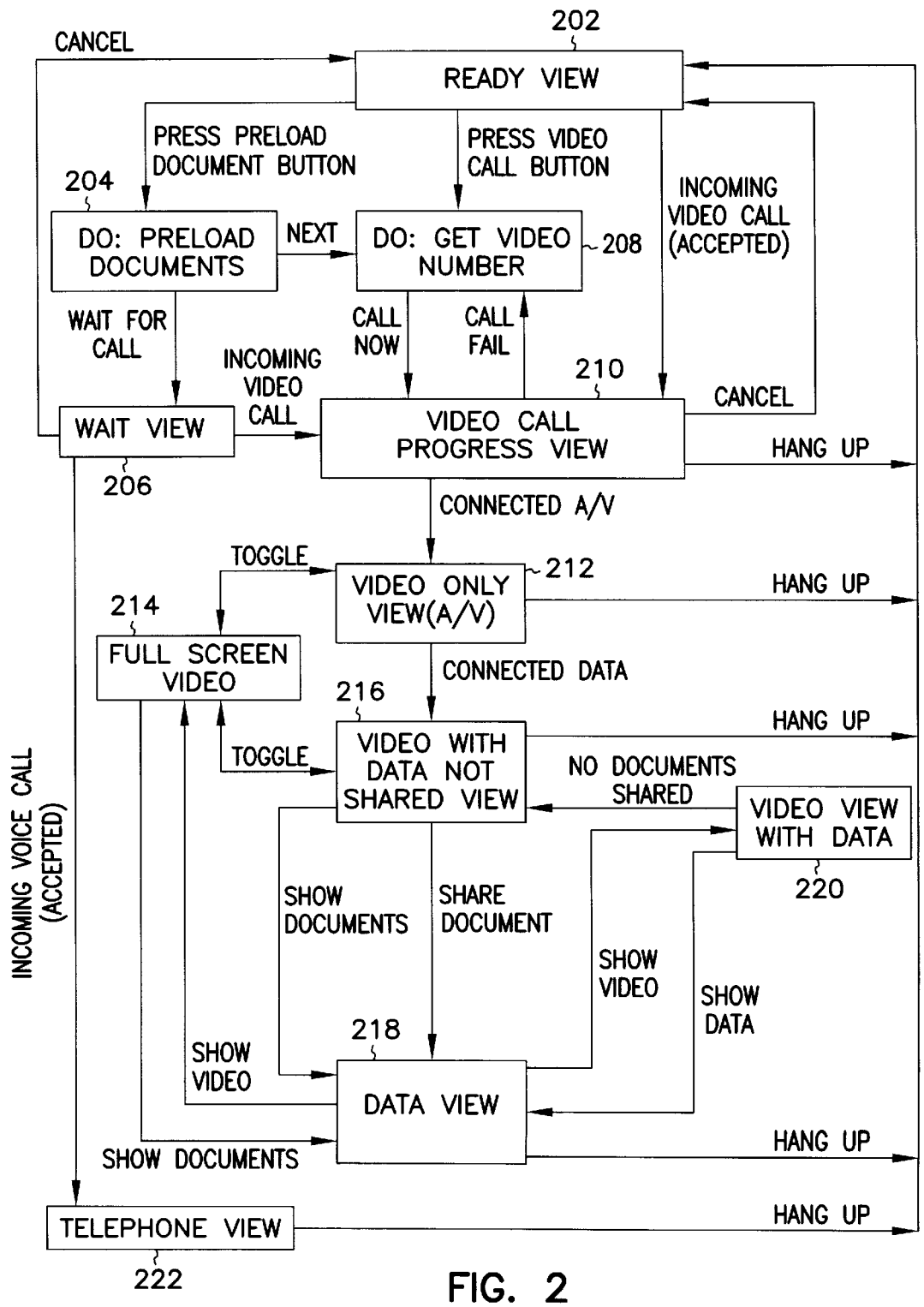
FIGS. 2 and 3 illustrate an example embodiment of state diagrams for the video conferencing interface according to the present invention.

Referring now to FIG. 2, there is illustrated a state diagram showing the various states of the video conferencing system according to the present invention. The Ready view 202 is the initial state of the system. If a "pre-load document" mode is selected (through a user interface mode select control, such as a "button"), the system performs any pre-load operations necessary 204 and waits for an incoming video call 206, or, if the Video Call mode is selected, the system gets a video number 208 from the user. If the call is placed, video call progress is displayed 210. Views 206 and 210 are have the same appearance as the Ready view 202, with a status message indicating the sub-state. If the call is hung up, the system returns to the Ready view.

If a call is connected, the system changes from the Ready view 202, and in particular the Call Progress view 210, to the Video Only view 212. This view and the Full-screen Video view 214 can be toggled between. The Video with Data not Shared view 216 can be entered from the Video Only view 212. From this view 216, the Data view 218 is entered if a user chooses to show or share a document. The Video with Data view 220 is entered from the Data view 218 if the user chooses the "show video" mode. Similarly, the Data view 218 is entered from the Video view with Data 220 if a user chooses the "show data" mode. Similarly, the Full-screen Video view 214 and Data view 218 can be toggled between by selecting the "show document" and "show video" options displayed in each respective view. All views return to the Ready view upon hanging up of the connection.

Figure 3:
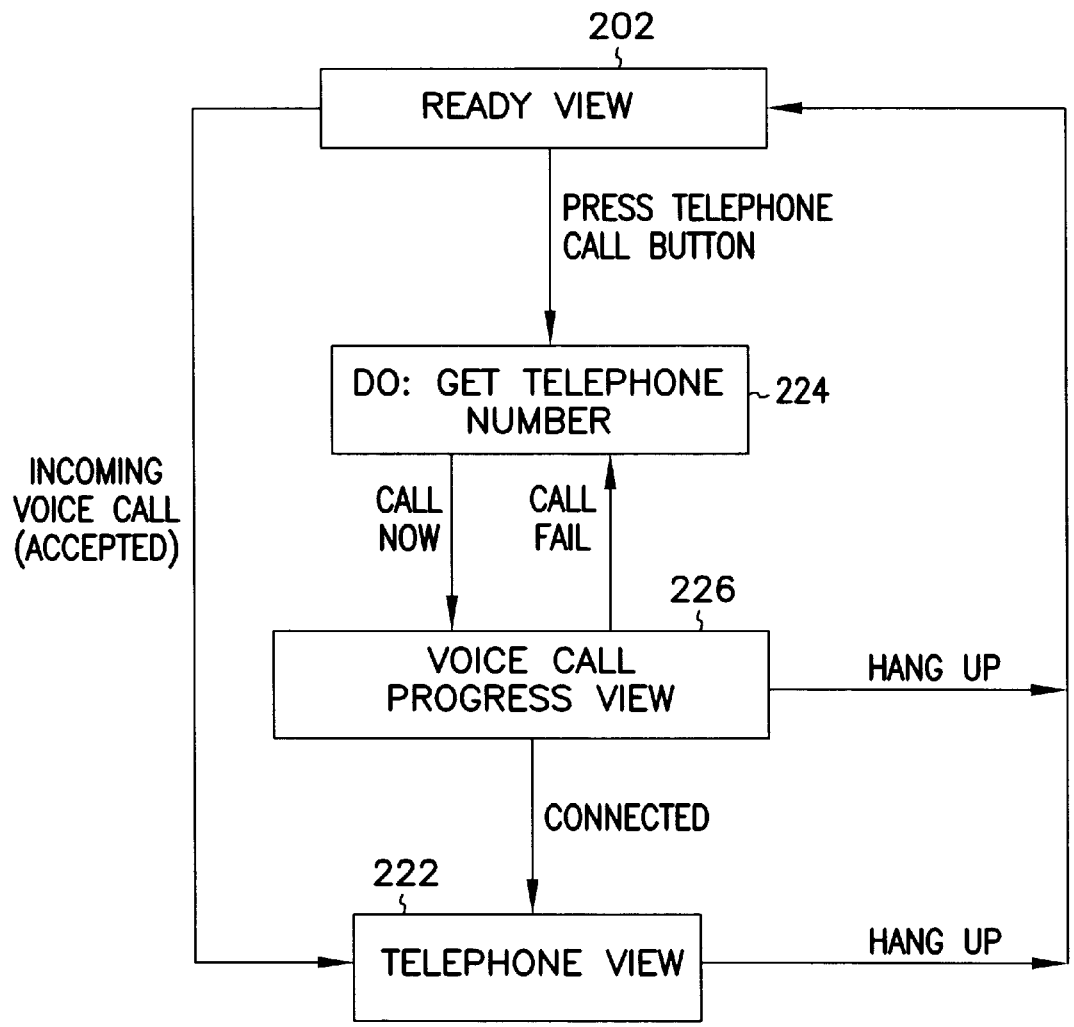

A Telephone view 222 is provided to handle voice only calls. A state diagram for telephone calls is shown in FIG. 3. If the "telephone call" button is selected while in the Ready view 202, the system retrieves a phone number to be dialed 224. If the call is placed, a voice call progress view is displayed, as a variant of the Ready view. If the call is successful, the Telephone view 222 is displayed. Hanging up at any point returns the system to the Ready view 202.

As will illustrated below, the above-described system modes provide six distinct views: Ready, Video, Full-screen Video, Floating Video, Data and Telephone Call view. According to one embodiment of the invention, these views are managed automatically for a user based on the current state of the conference. In general, these modes of operation provide for simultaneously displaying local and far end video, and sharing data through an application. These views are described below with respect to the position and size of the local video image, local video image, data tools, and application window. Illustrated below are various different embodiments of the user interface according to the present invention.

Figure 4:
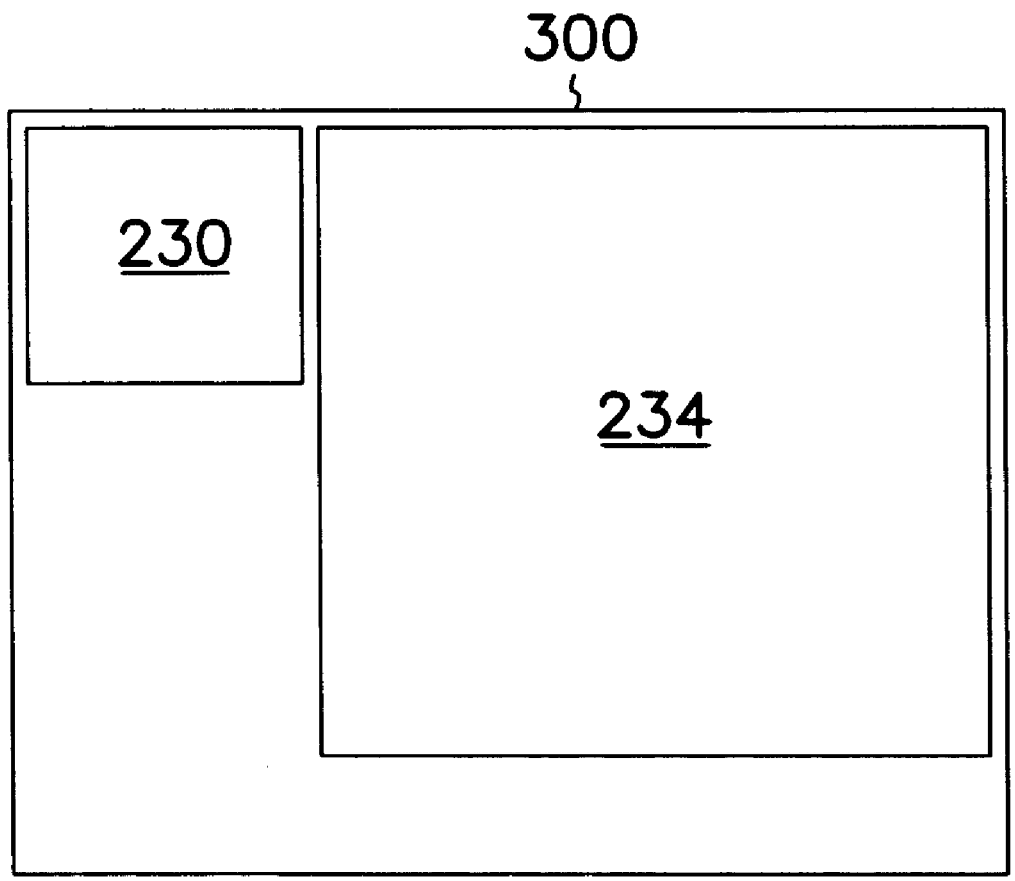
FIGS. 4–12 illustrate an example embodiment of the user interface according to the present invention.

Referring now to FIGS. 4–12, there is illustrated a first embodiment of the invention. In this embodiment, and the others described herein, the system runs on an operating system such as Microsoft®, Windows®, or the Apple Macintosh®, Finder®. As illustrated in FIG. 4, the user interface for the system is displayed in a main window 300 which has two principal areas where video and/or data applications can be viewed, namely a small video area or window 230 and a large video/application area 234. The size of the larger area 234 may be proportioned based on the video resolution available on the host system.

Figure 5:
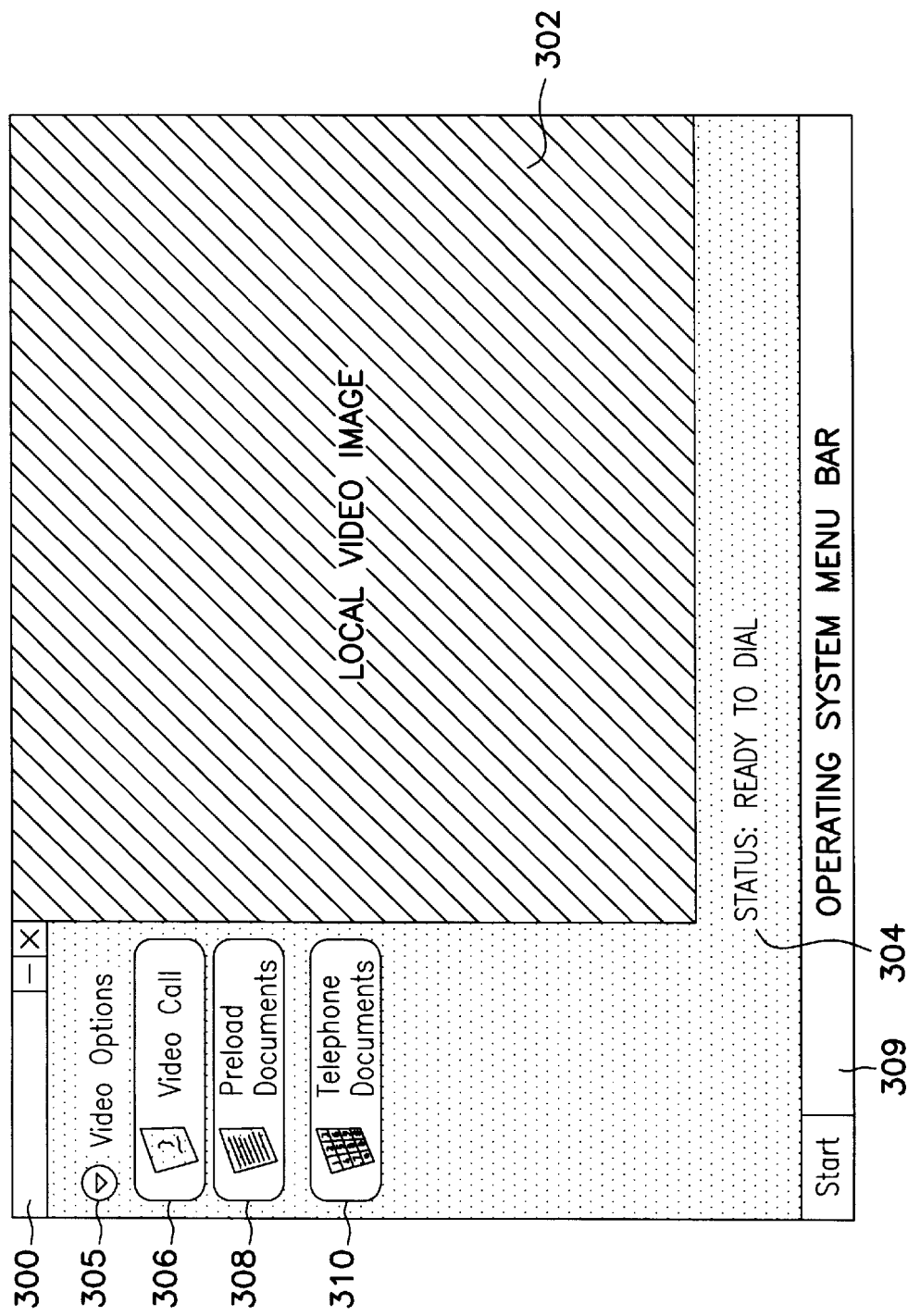

As illustrated in FIG. 5, the Ready view includes a local video image 302 (the video feed from the local site) sized and positioned to fill the large video/application area, within the application window 300. The remote video image 312 (the video feed from the remote site) is hidden from view. A status message 304 indicates that the system is ready to dial. Four control options, in the form of mouse activated buttons, are prominently presented for the user's choice: video options 305, video call 306, preload documents 308 and telephone call 310, allowing the system to be switched between states. Video options may include, in one example embodiment, controls allowing the selection of video display modes like full screen video. However, the mechanism used to provide video options is not important to the invention. The video call button 306 initiates a video call sequence (FIG. 2; 202, 208, 210). The preload documents button 308 initiates a document loading sequence (FIG. 2; 204). The telephone call button 310 initiates a telephone call sequence (see FIG. 3). Also shown in FIG. 5 is the operating system menu bar 309, in this case the Taskbar for the Windows® operating system, which includes a "start" button.

Figure 6:
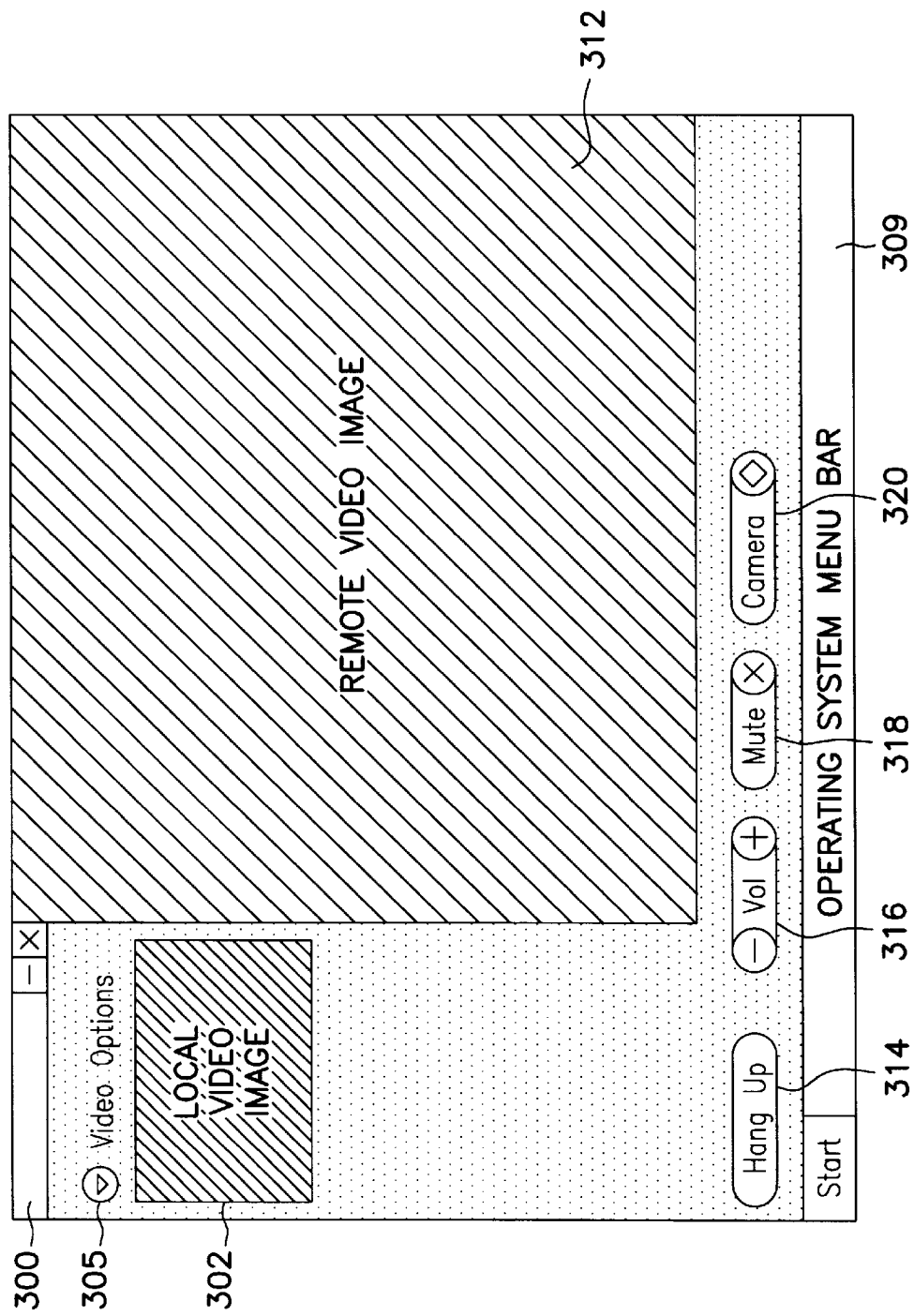

Referring now to FIG. 6, there is illustrated the Video Only view according to this embodiment of the invention. The local video image 302 is moved and sized to fill the area of the small video window. The remote video image 312 is sized and displayed in the large video/application area. Five control options, in the form of buttons, are prominently presented for the user's choice: video options 305, hang up 314, volume 316, mute 318 and camera 320. The hang up button 314, volume button 316 and mute button 318 provide for, respectively, hanging up a call, controlling volume and muting. The camera button 320 provides camera control functions to control for example, aiming or zooming the local or remote camera.

Figure 7:
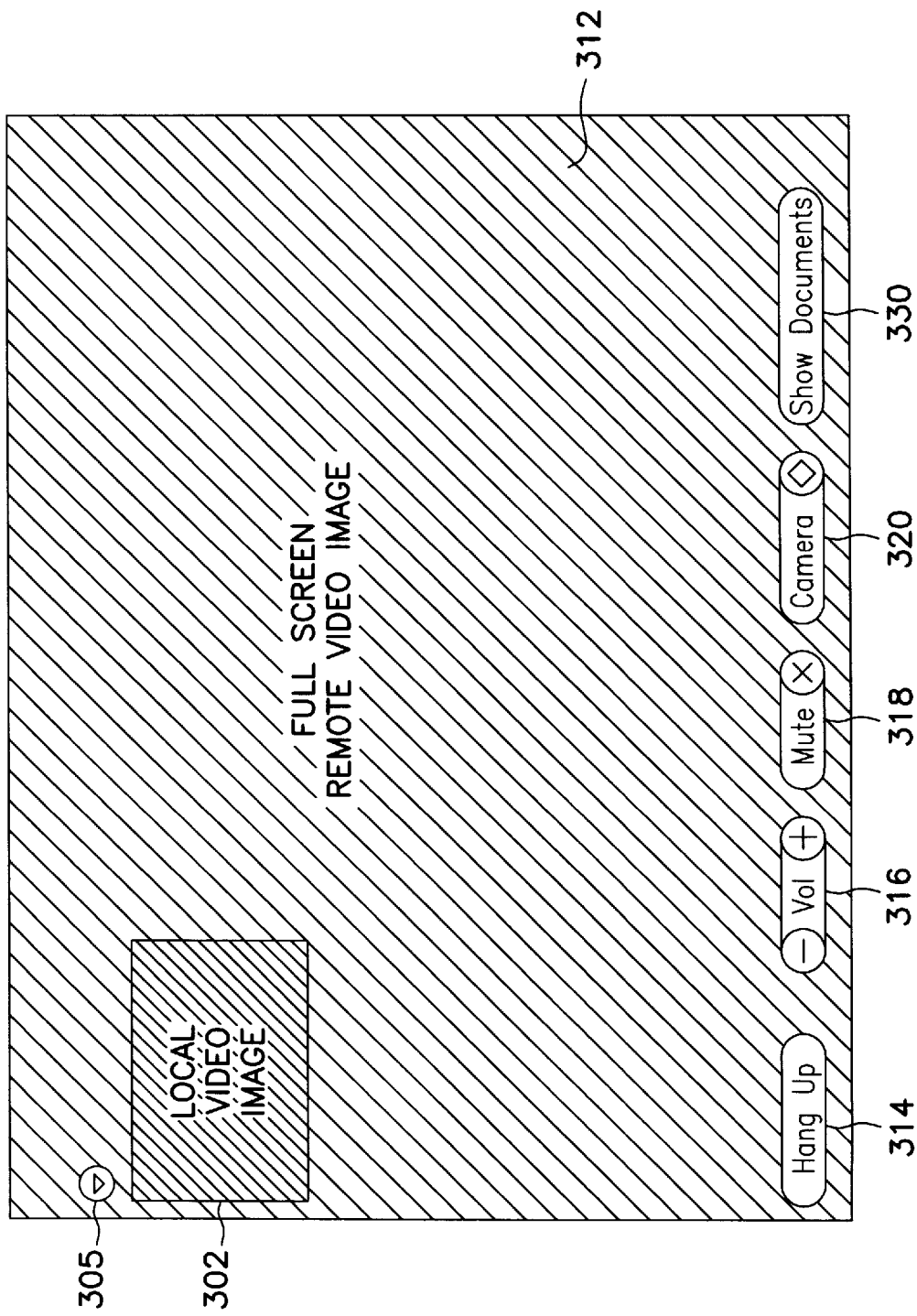

Referring now to FIG. 7 there is illustrated the Full-screen Video view. This view is only displayed by direct user action, which, for example, may require the user to click on a menu item in the video options 305 when in a video conference. The user is permitted to switch between the Video Only view and the Full-screen Video, or Data and Full-screen Video view. In the Full-screen Video view, the local video image 302 window is moved and sized to fill the small video window. The remote video image 312 is sized and positioned to fill the entire screen display. In this case, only video is available to the user, and the Windows® menu bar 309 is hidden from view.

Figure 8:
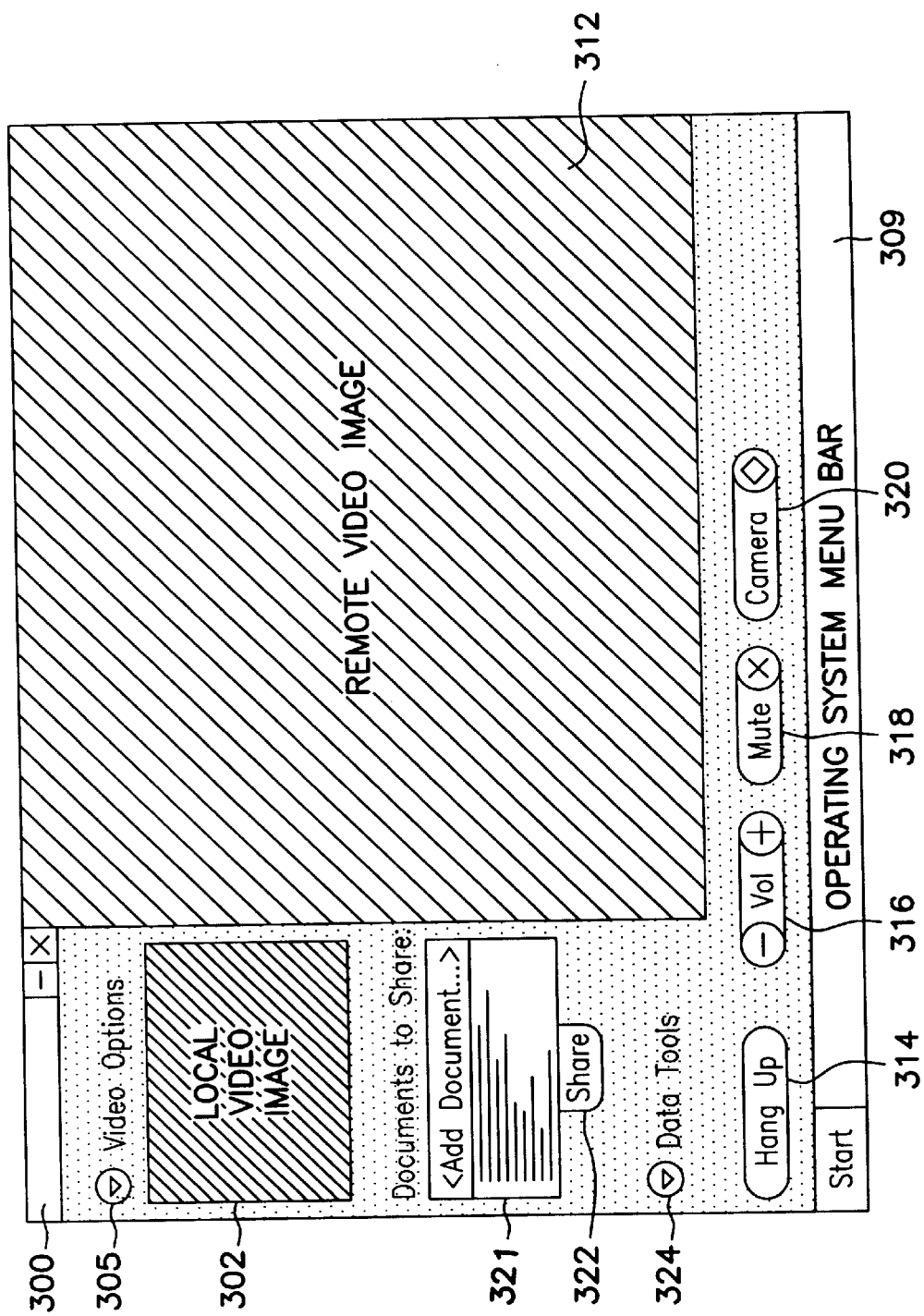

Referring now to FIG. 8, there is illustrated the Video with Data Not Shared view. A list of documents to share 321 is displayed, wherein one of the listed documents can be highlighted with a mouse pointer, and then chosen using the share button 322. In one example embodiment, a data tools button 324 is also displayed, providing, for example, access to data tool options such as a pointer that may be used to point at data in a shared application.

Figure 9:
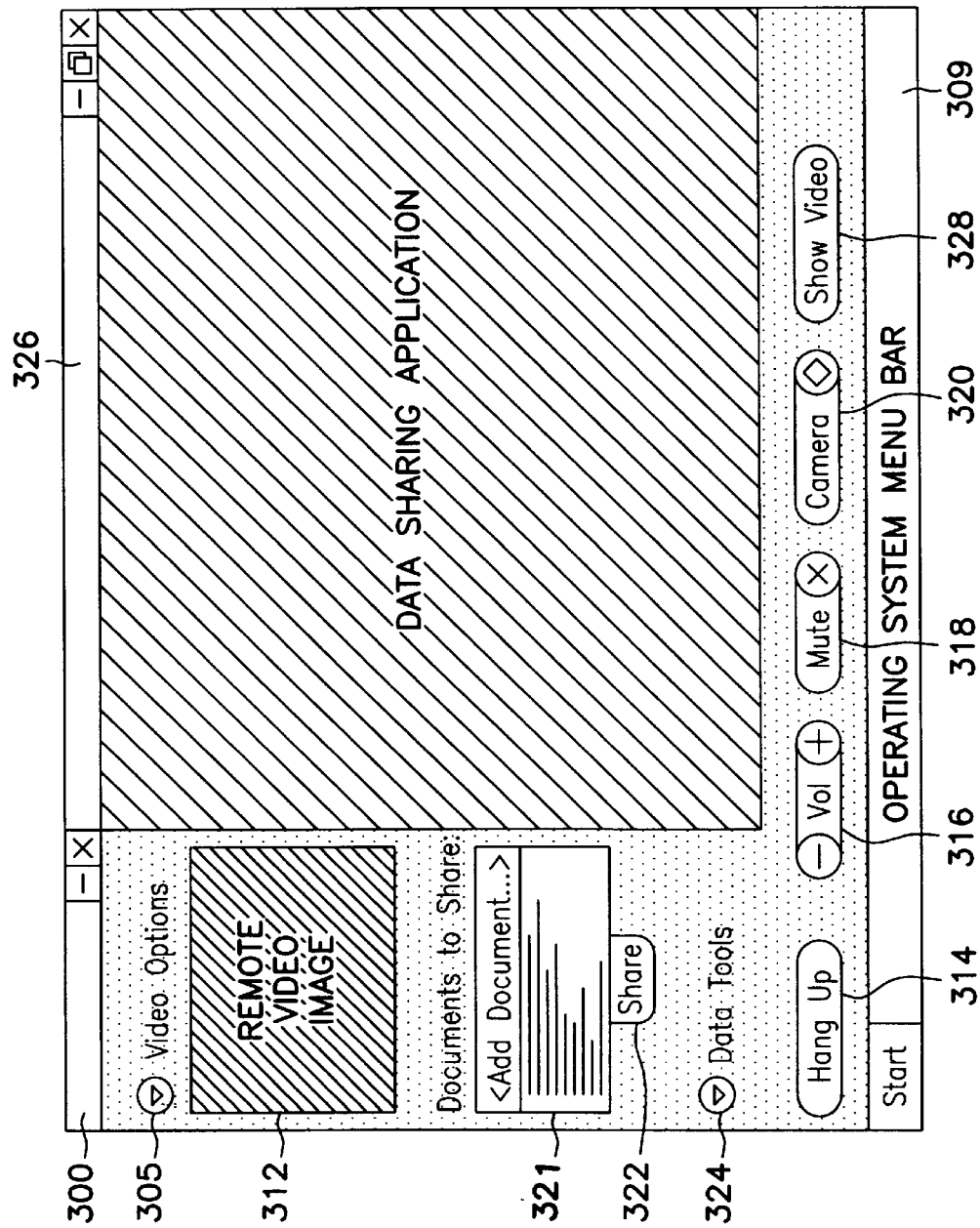

Referring now to FIGS. 9 there is illustrated the Data view according to this embodiment of the invention, entered by selecting the share button 322. In the display of FIG. 9, the main window of the video conferencing application 300 is reshaped into an "L" configuration. The large video/application area (FIG. 4, 324) is filled with a data sharing application 326, for example, a "whiteboard" application, a word processing application, or a spreadsheet application. Detection of data sharing may be ascertained, for example, using the functionality of Microsoft's NetMeeting system. Within the L-shaped main window, the local video image 302 is hidden from view. The remote video image 312 is moved and sized to fill the small video window. Control options are the same as are provided in the Video with Data Not Shared view, with the addition of a show video button 328.

Figure 10:
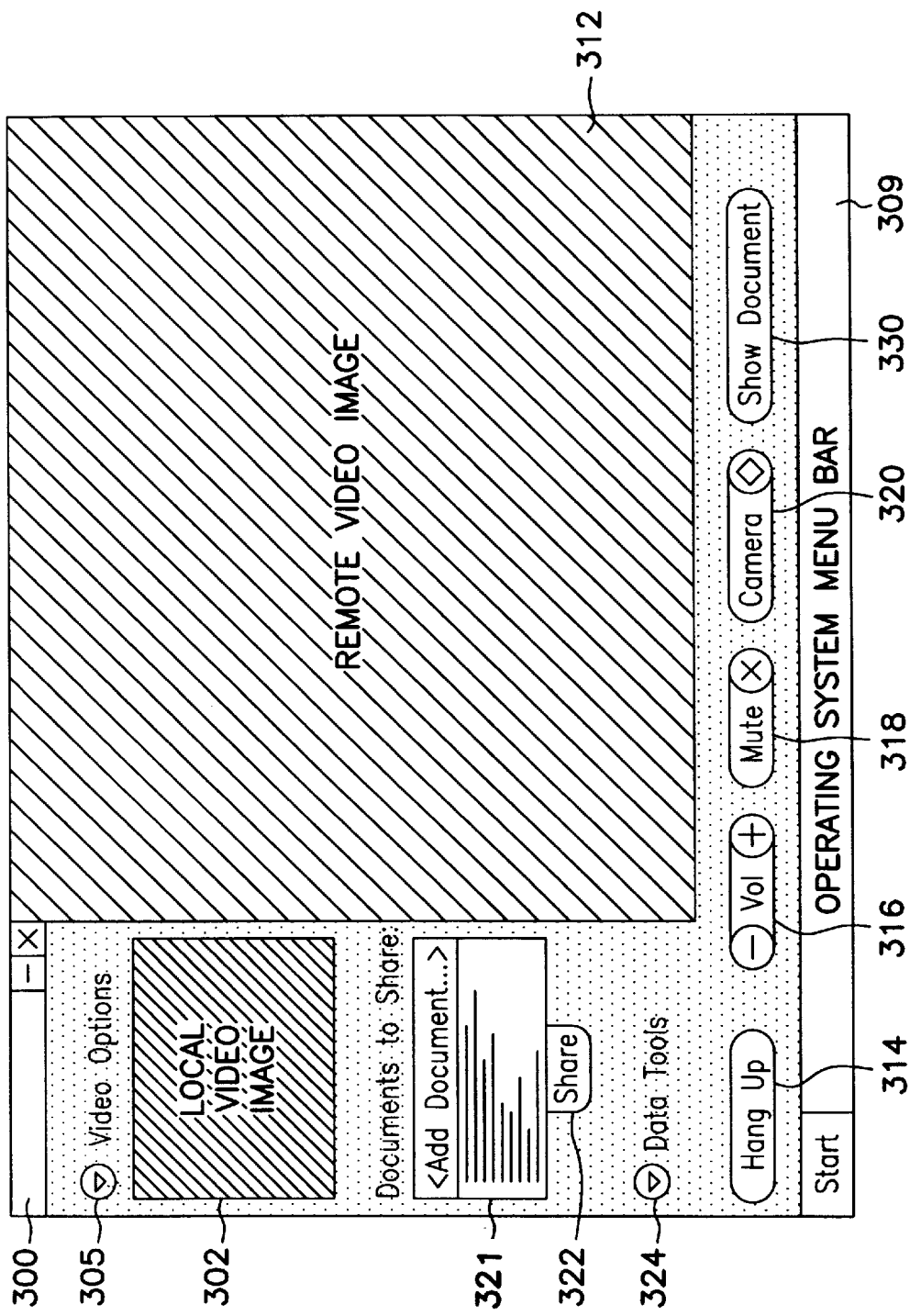

Choosing the show video option toggles the system to the Video with Data view shown in FIG. 10, which is similar to that of FIG. 9, with the show video button 328 toggled to a show documents button 330. Choosing this button toggles the system back to the interface of FIG. 9.

Figure 11:
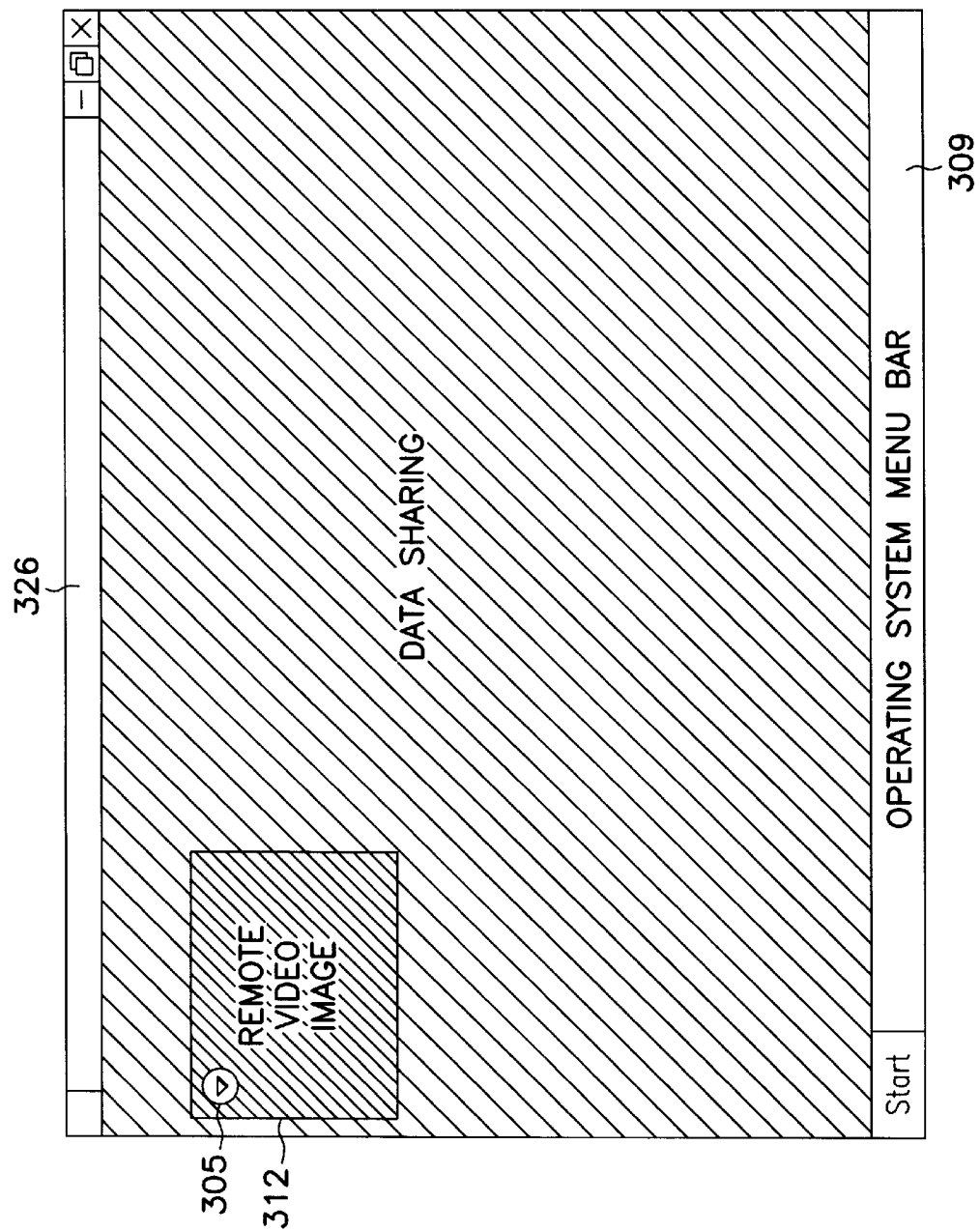

Referring now to FIG. 11, there is illustrated the Floating Video view. This view is invoked when the system detects that an application 326 has been launched full screen on top of the system's main window 300. In this view, the main window 300 is hidden from view. A new window is created, sized and positioned over the small video window area. This new window contains a new remote video image 312 window. In one example embodiment, this transition appears seamless enough to a user so that it appears as if the main window has shrunk to become just the new local video image window. The small video window is set to topmost in the Windows® operating system (meaning that it cannot be covered by another window), and can be moved around on the screen by the user. Video options 305 are available from this window.

Figure 12:
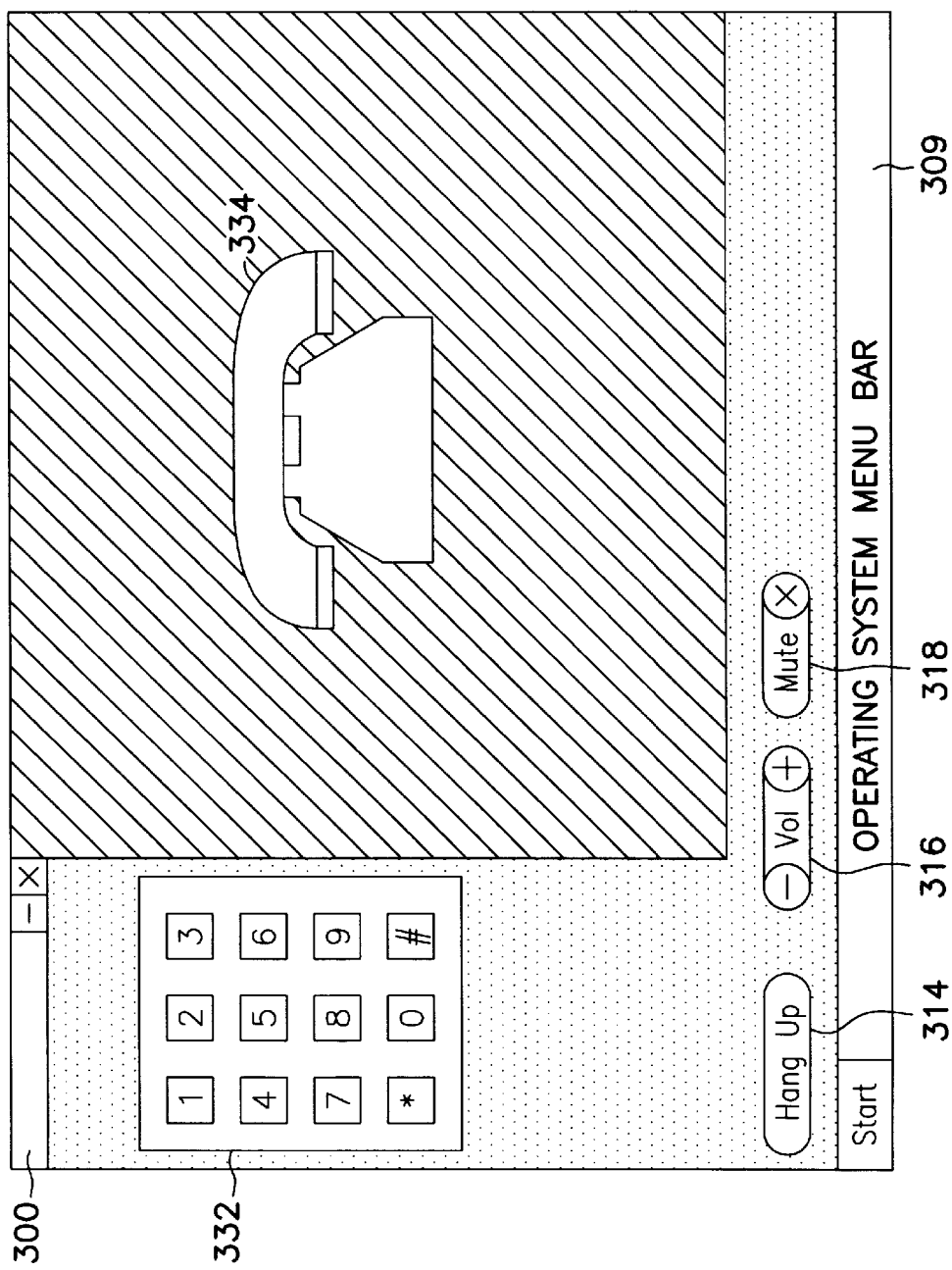

Referring now to FIG. 12, there is illustrated the Telephone Call view. This view is displayed when a voice-only telephone call is established. In this view, there is no video so the local and remote video image 312 windows are hidden from view. A telephone-like keypad 332 is positioned over the small display area and a graphic of a phone 334 is drawn in the large display area.

Referring now to FIGS. 13–20, there is illustrated another embodiment of the invention adapted for platforms with dual monitors. According to this embodiment, the near end video and the shared applications are displayed on the main, or primary monitor display 340. The far end video is displayed in the second monitor display 342.

Figure 13:
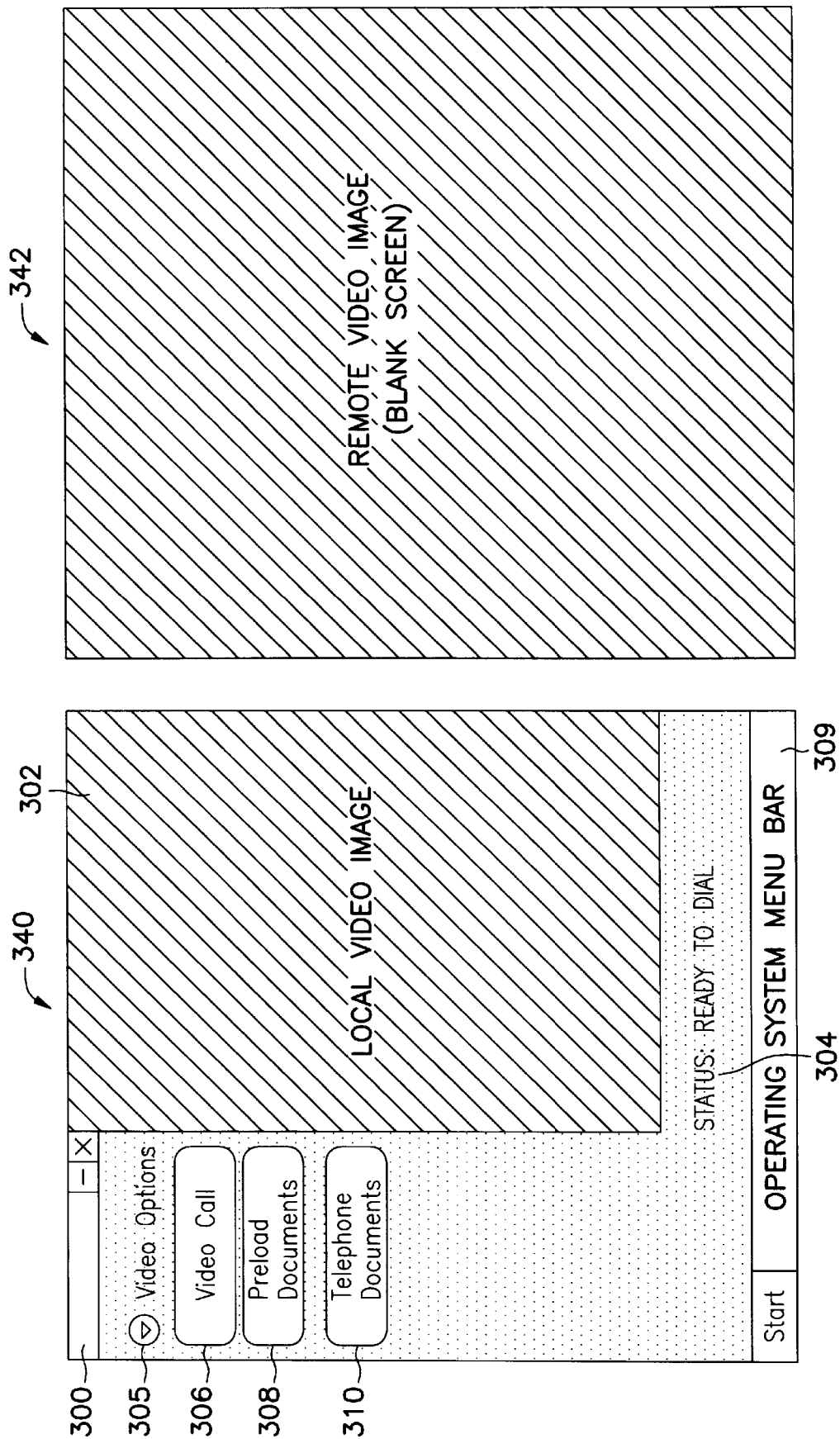
FIGS. 13–20 illustrate another example embodiment of the user interface according to the present invention.
Figure 14:
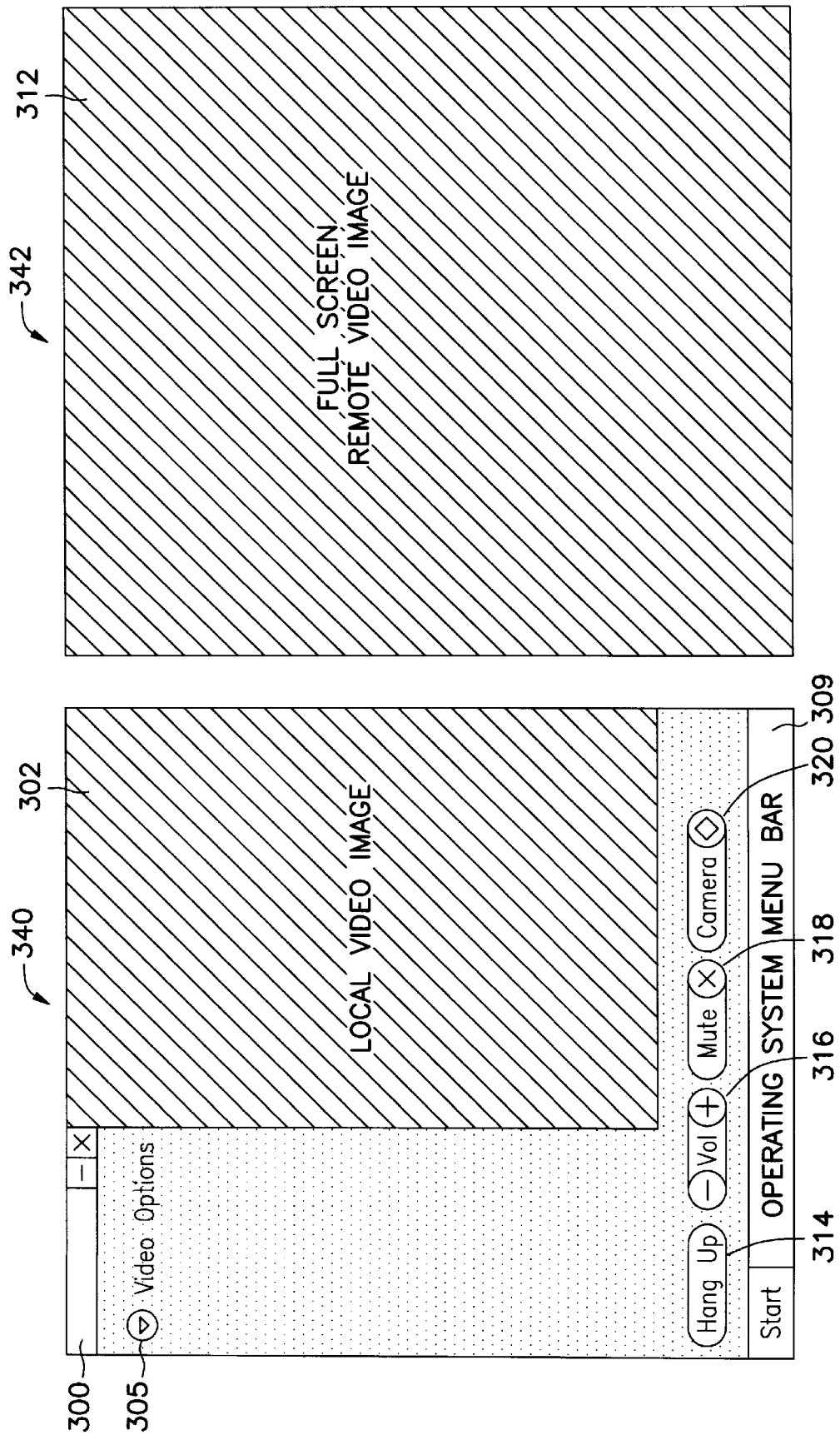
Figure 15:
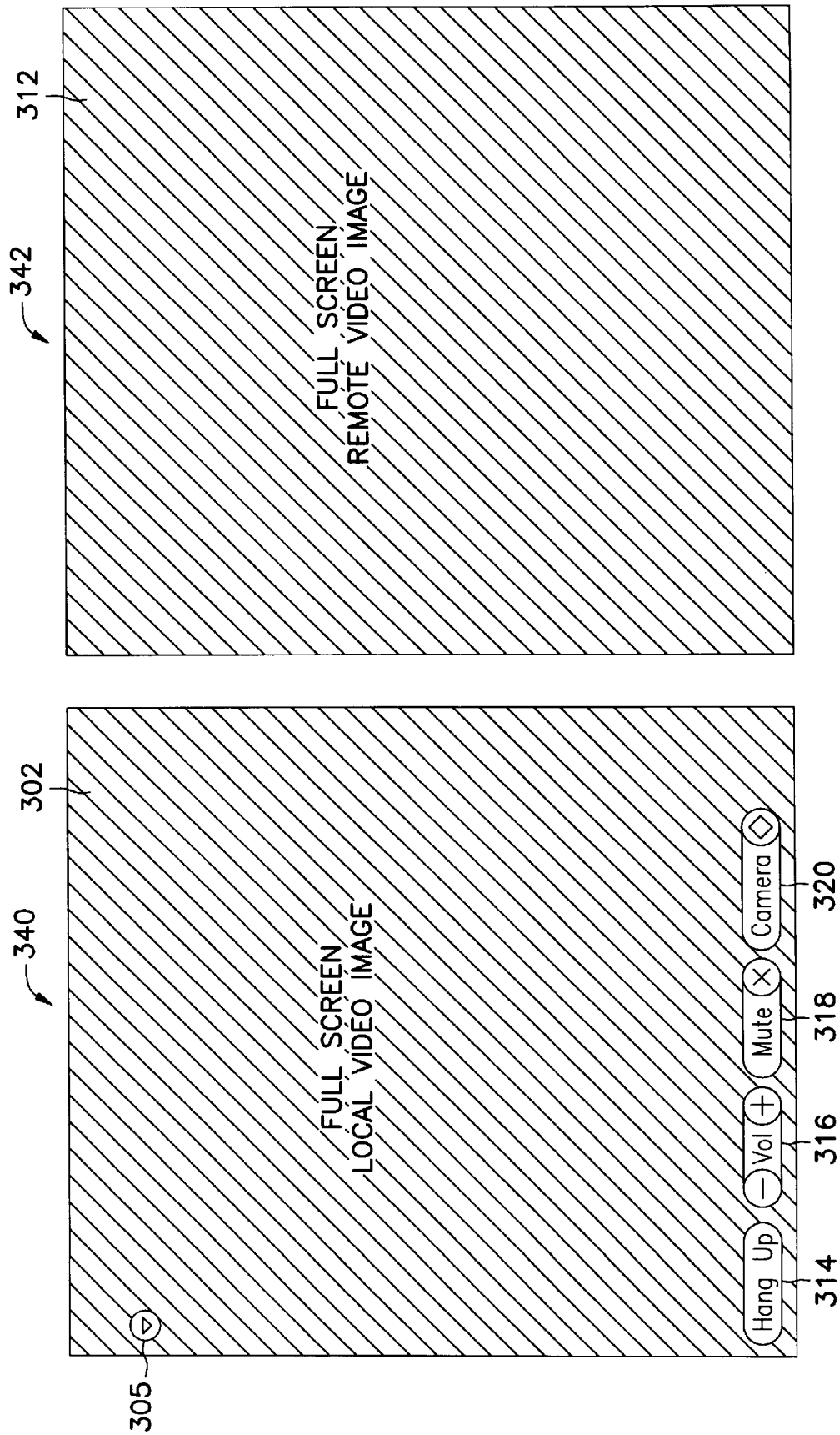
Figure 16:
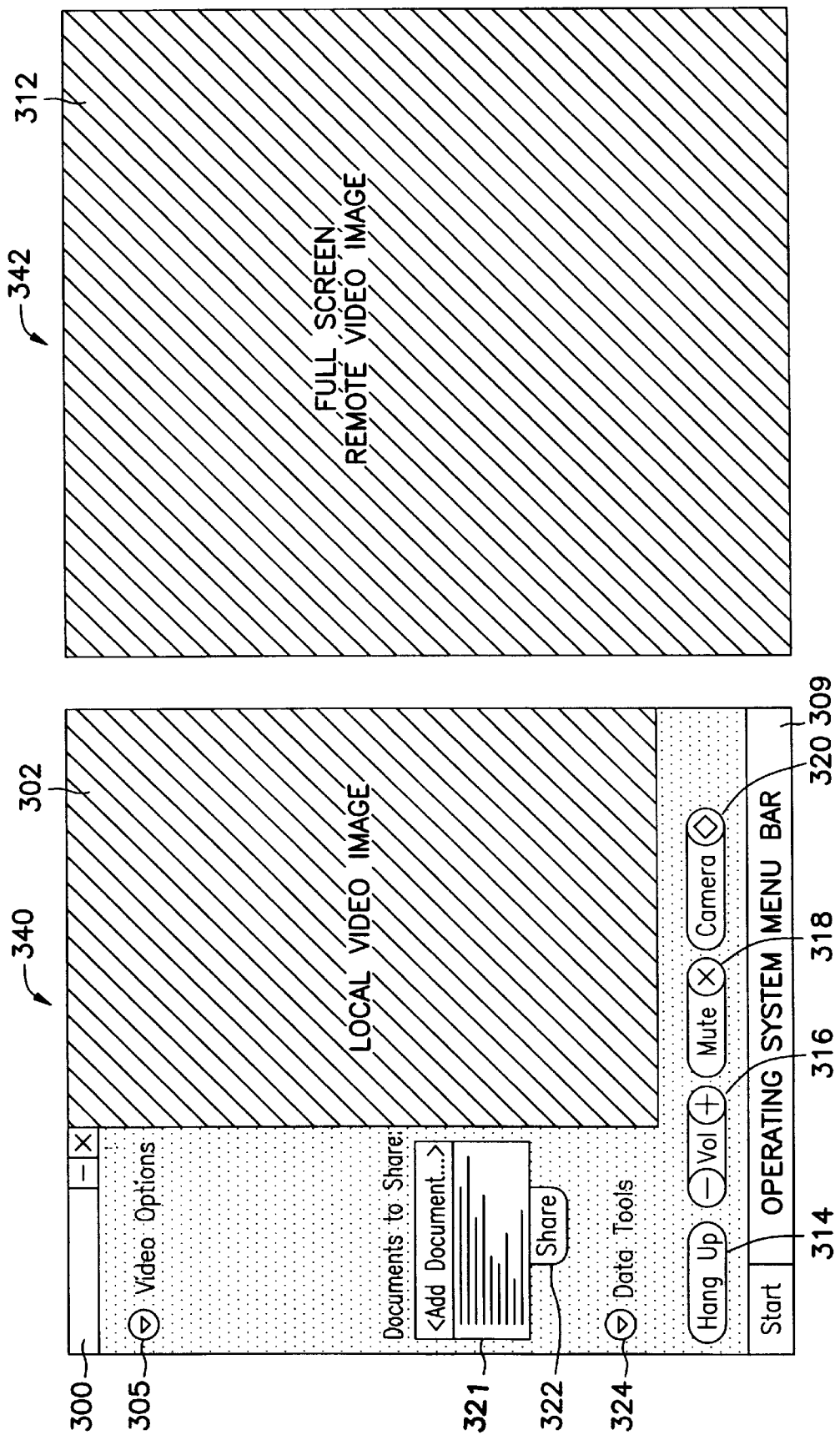
Figure 17:
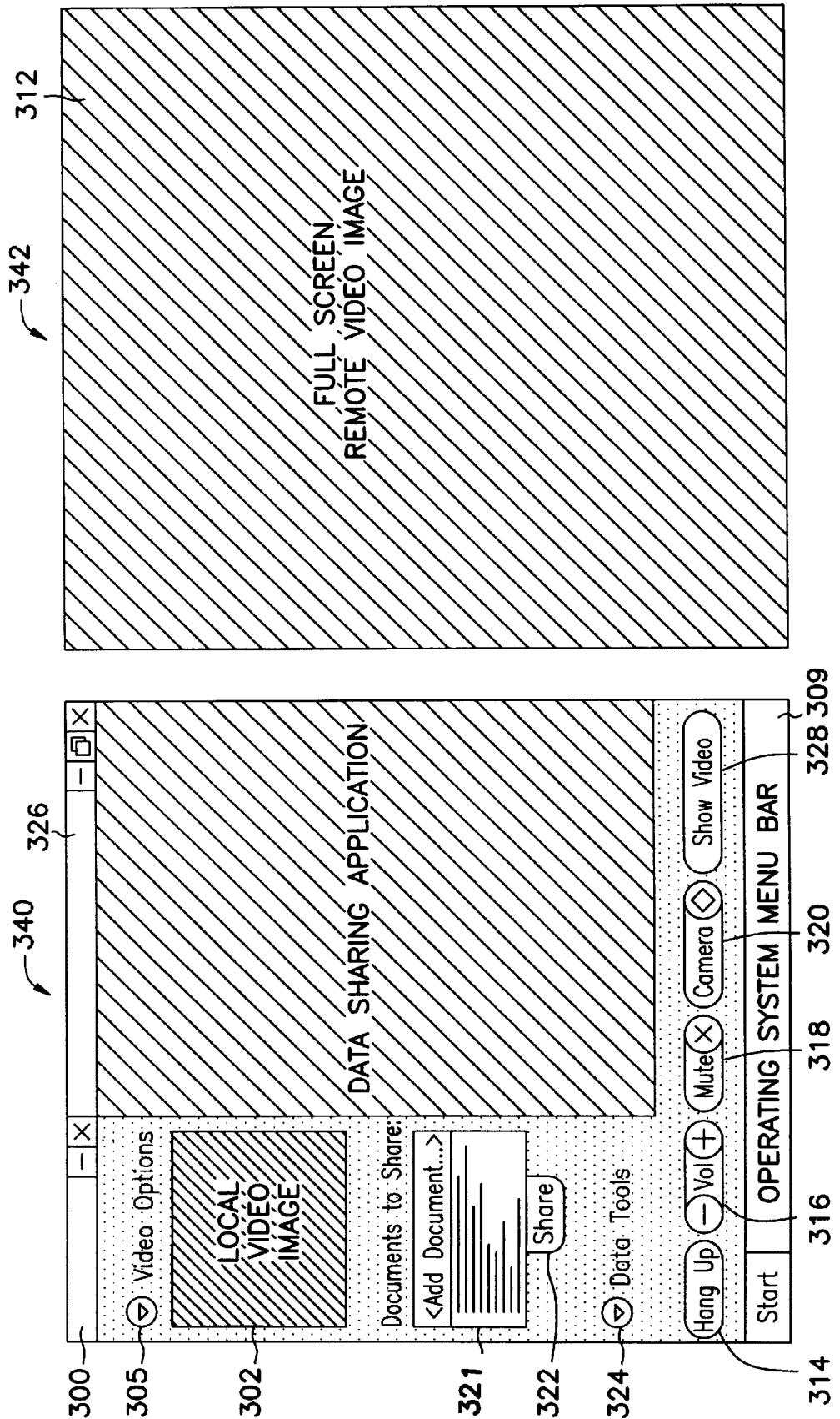
Figure 18:
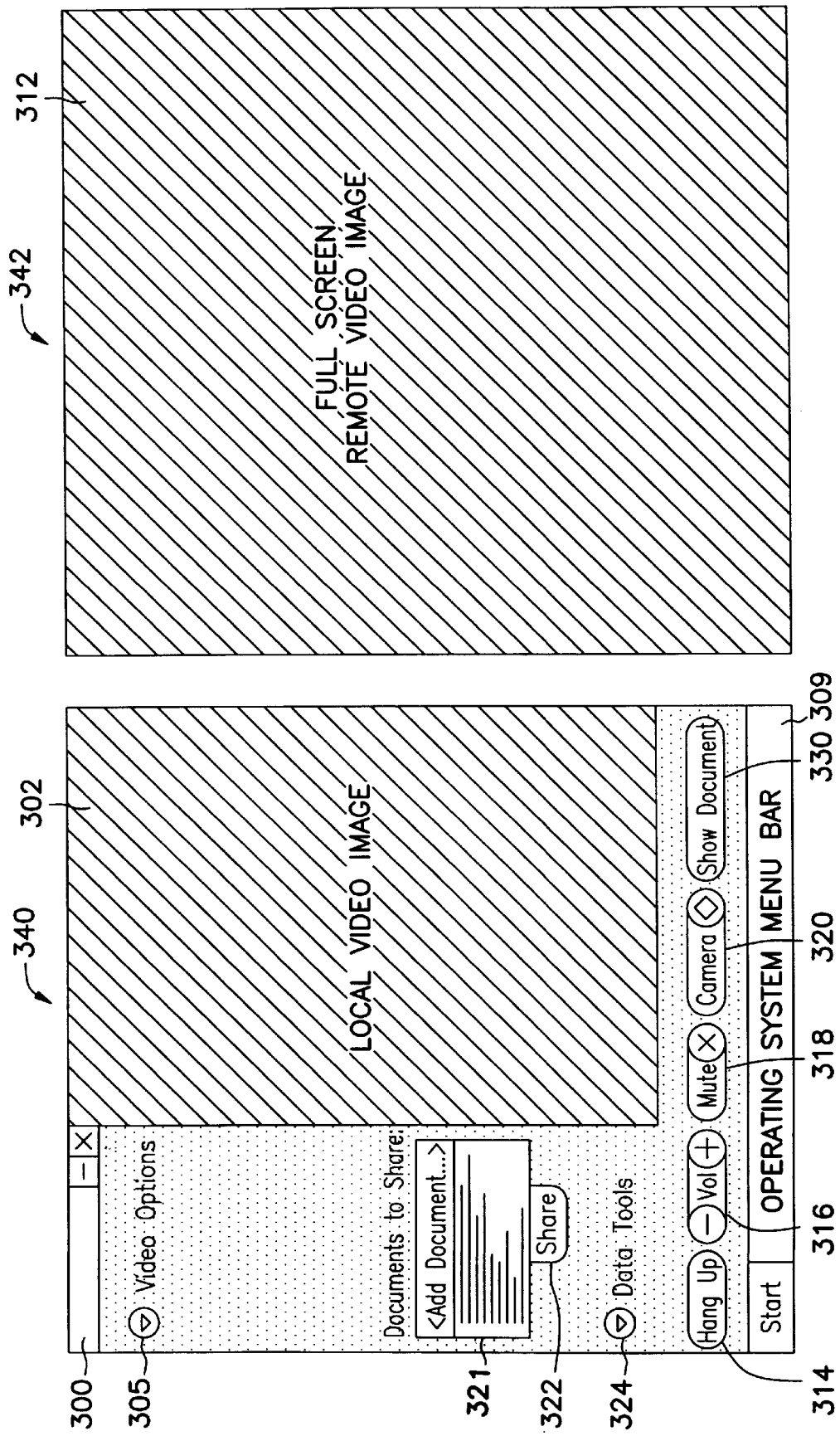
Figure 19:
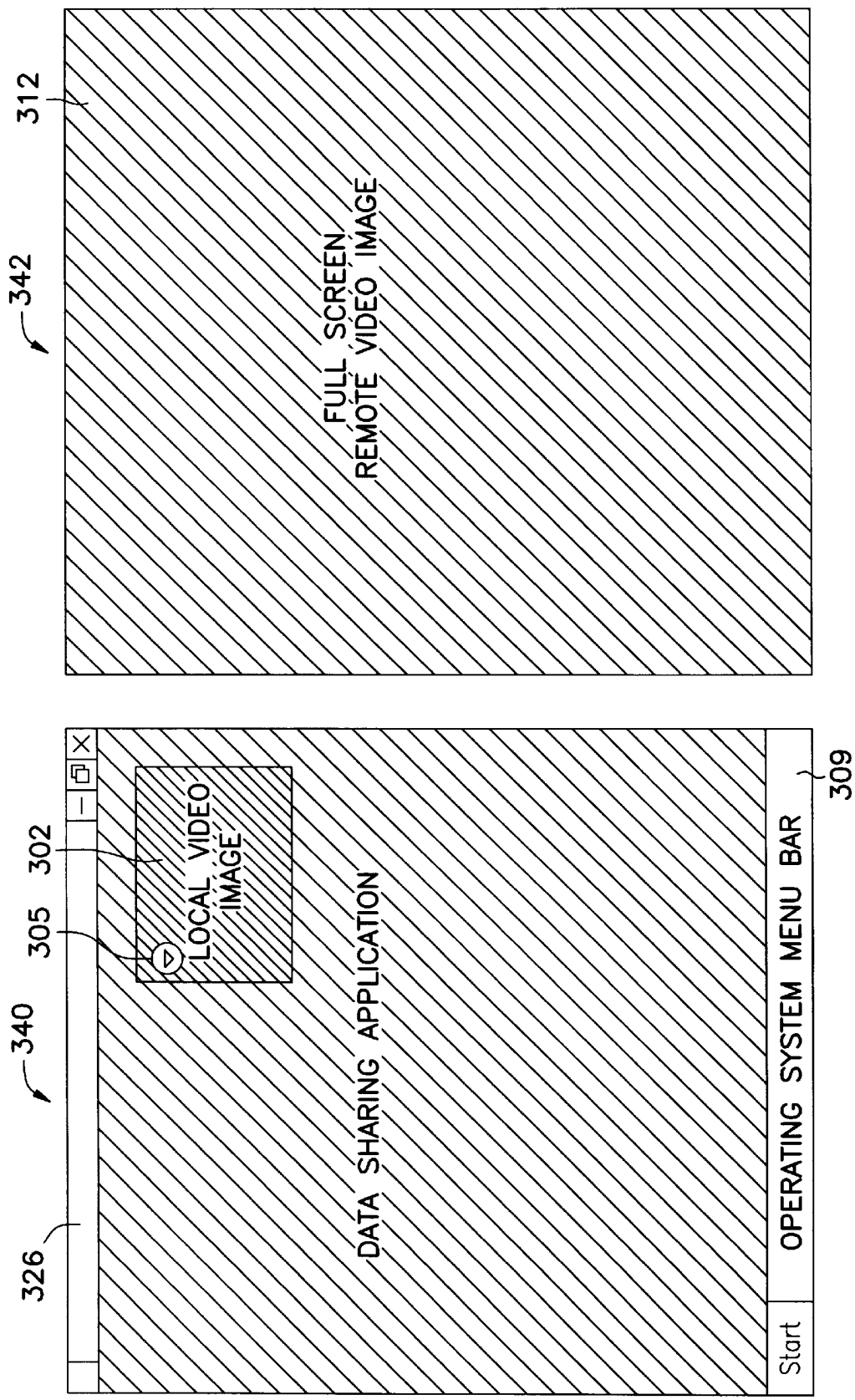
Figure 20:
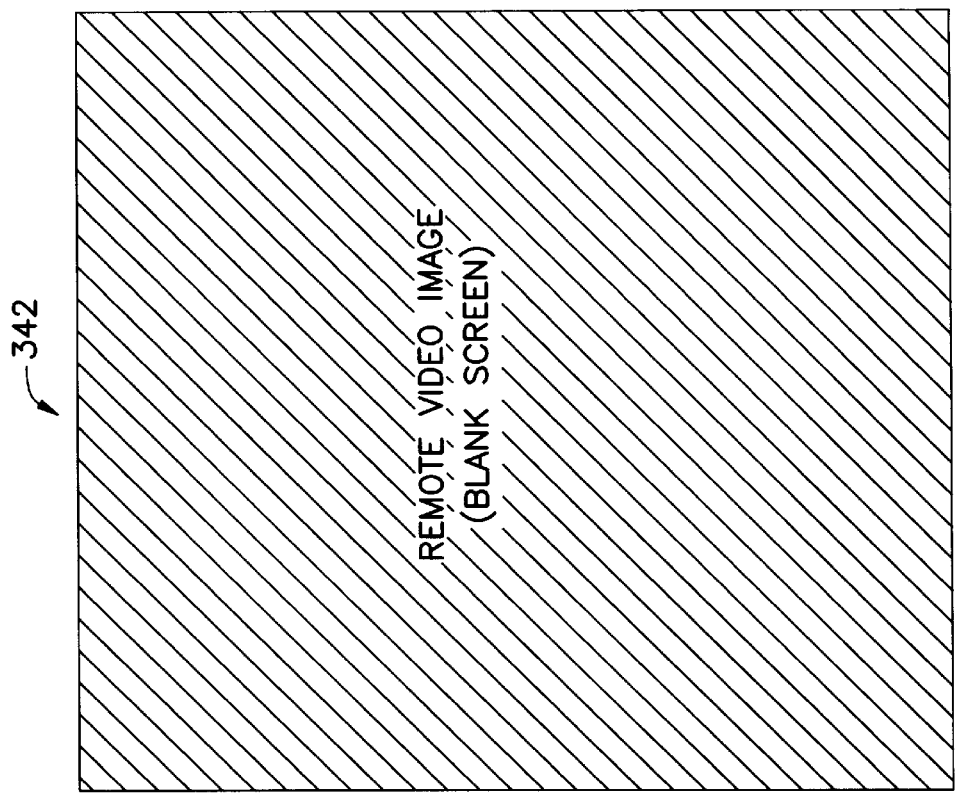
Figure 20:
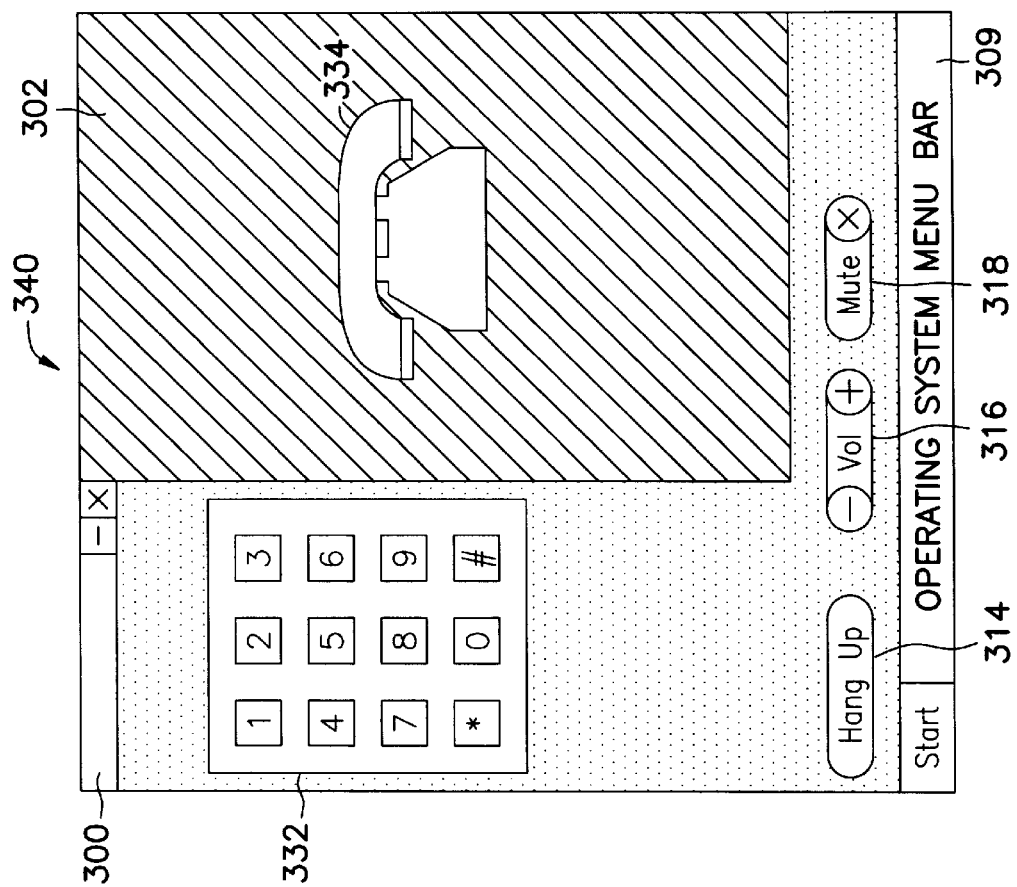

Referring now to FIG. 13, there is illustrated the Ready view according to this embodiment of the invention. This view is similar to the view illustrated in FIG. 5, with the second monitor display 342 blank. Referring now to FIG. 14, there is illustrated the Video Only view according to this embodiment of the invention. The local video image 302 remains displayed in the large video/application area. The remote video image 312 is displayed full screen on the second monitor display 342. Referring now to FIG. 15, there is illustrated the Full-screen Video Only view. In this view, the local video image 302 window is sized and positioned to fill the entire screen display of the primary monitor display 340, while the remote video image 312 continues to be displayed full screen in the second monitor display 342. In display 340, the Windows® menu bar 309 is hidden from view. The control buttons video options 305, hang up 314, volume 316, mute 318 and camera 320 are displayed on top of the full screen video. Referring now to FIG. 16, there is illustrated the Video with Data Not Shared view. This view is the same as that of FIG. 14, with the addition of the document sharing options (321, 322, 324). Referring now to FIG. 17, there is illustrated the Data view according to this embodiment of the invention. In the interface of FIG. 17, the primary monitor display 340 presents the same display as illustrated in FIG. 9, except that the local video image 302 is shown in the small display area, with the local video image in the second monitor display 342. Choosing the show video 328 option toggles the system to the view shown in FIG. 18, which is similar to that of FIG. 16, with the show video button 328 changed to a show documents button 330. Choosing this button toggles the system back to the interface of FIG. 17. Referring now to FIG. 19, there is illustrated the Floating Video Only view. This view is invoked when the system detects that application 326 has been launched full screen on top of the system's main window 300. In this view, the main window 300 is hidden from view. A new window is created, sized and positioned initially over the application 326, and contains a new remote video image 312 window. Referring now to FIG. 20, there is illustrated the Telephone Call view, which is similar to the embodiment of FIG. 12.

Referring now to FIGS. 21–26, there is illustrated another embodiment of the invention adapted for platforms with dual monitors. According to this embodiment, the near end and far end video is presented in separate monitors when data is not shared. Shared applications are displayed in a separate monitor, and local 302 and remote video image 312 is combined.

Figure 21:
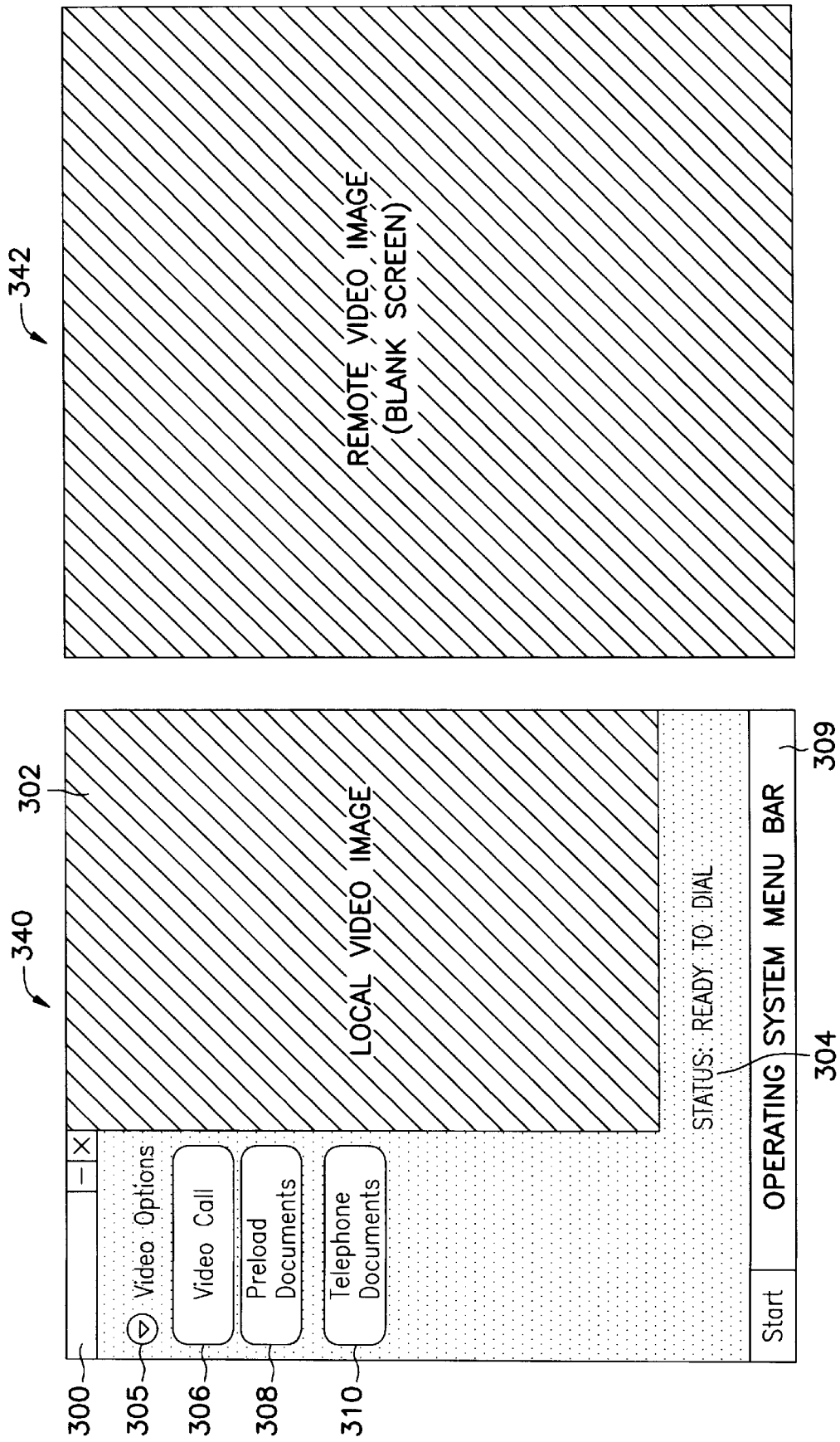
FIGS. 21–27 illustrate still another example embodiment of the user interface according to the present invention.
Figure 22:
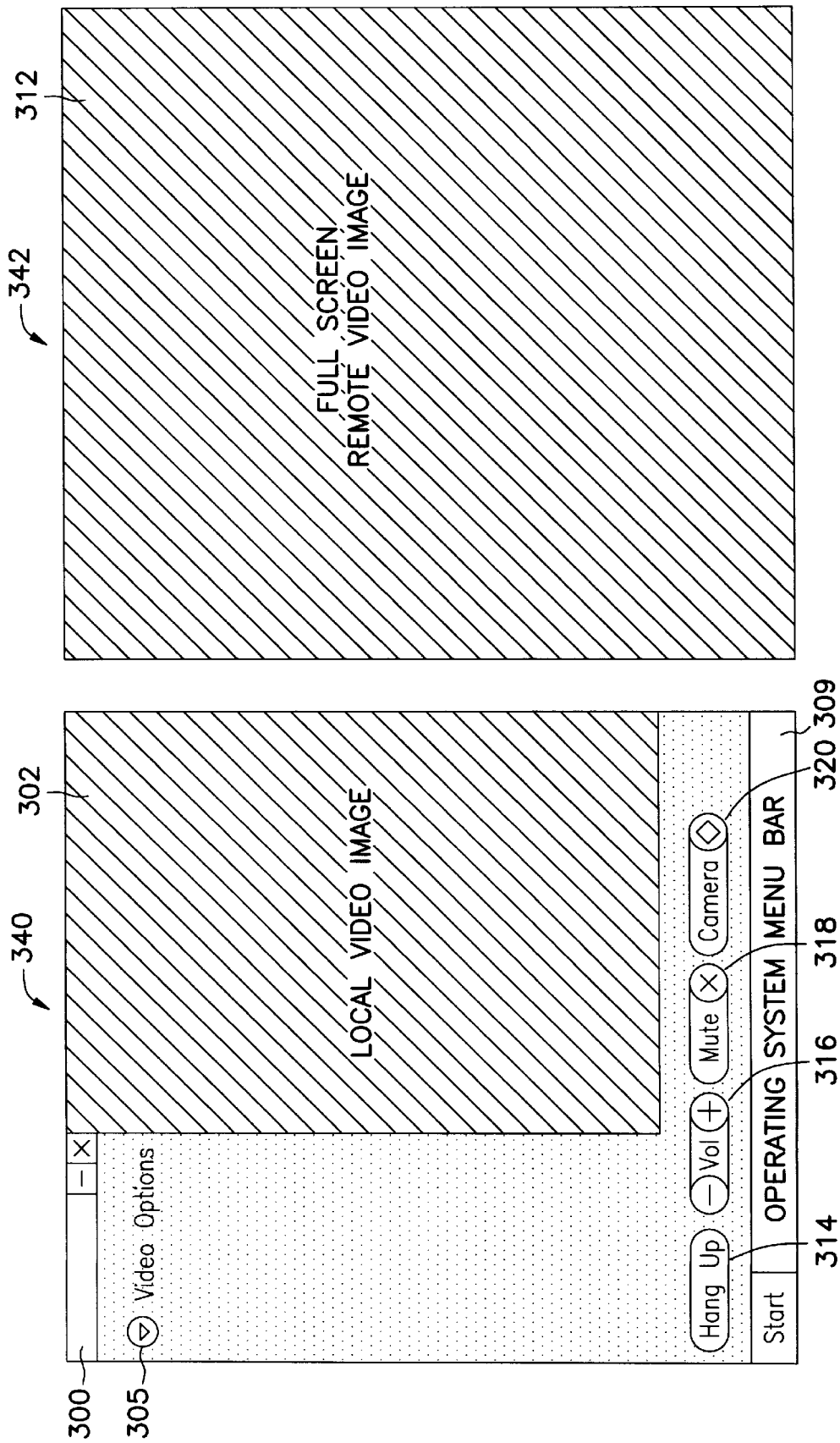
Figure 23:
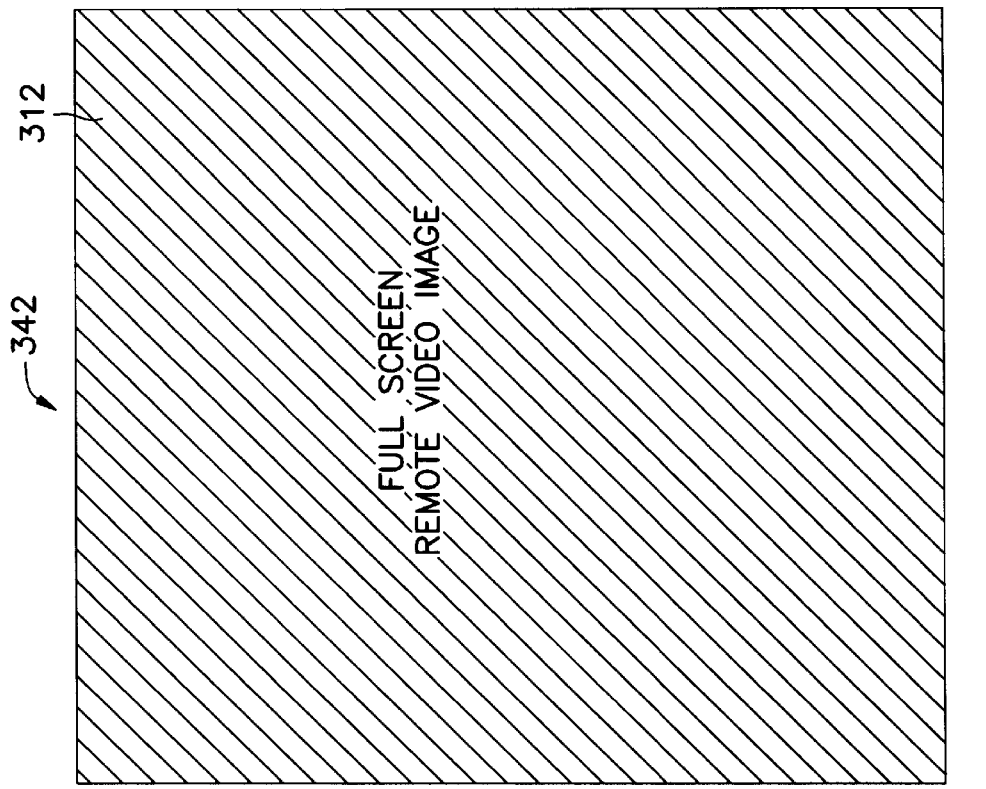
Figure 23:
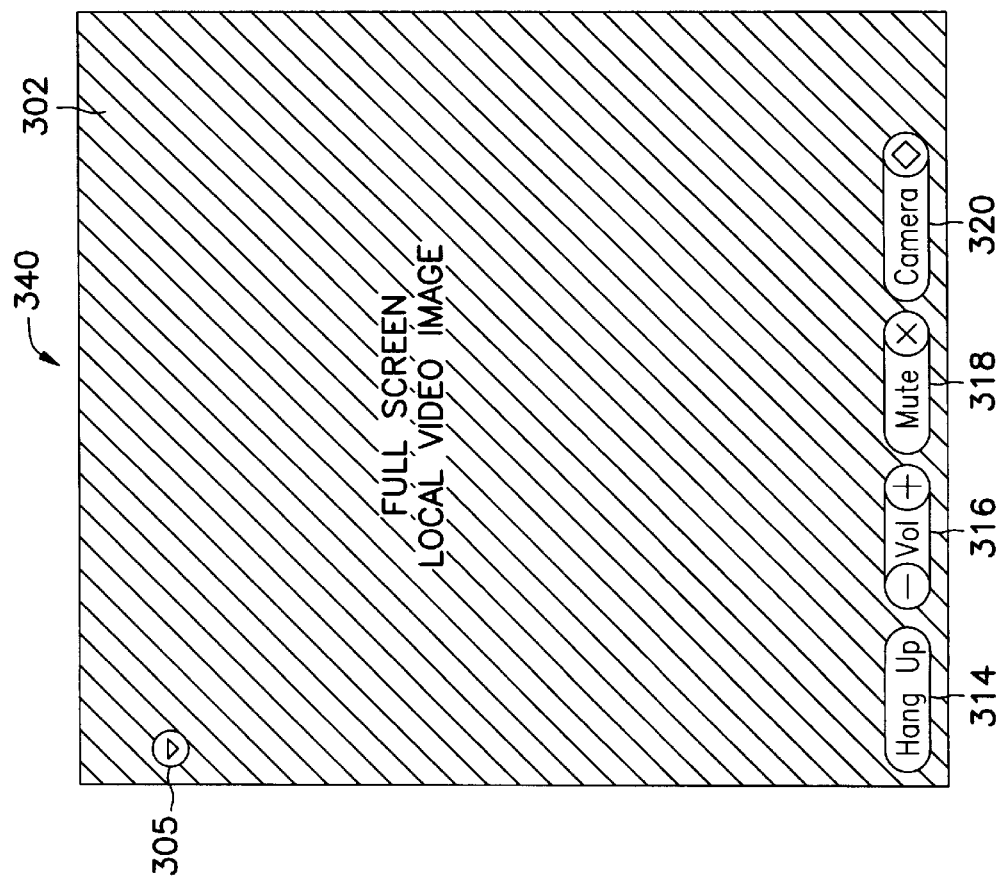
Figure 24:
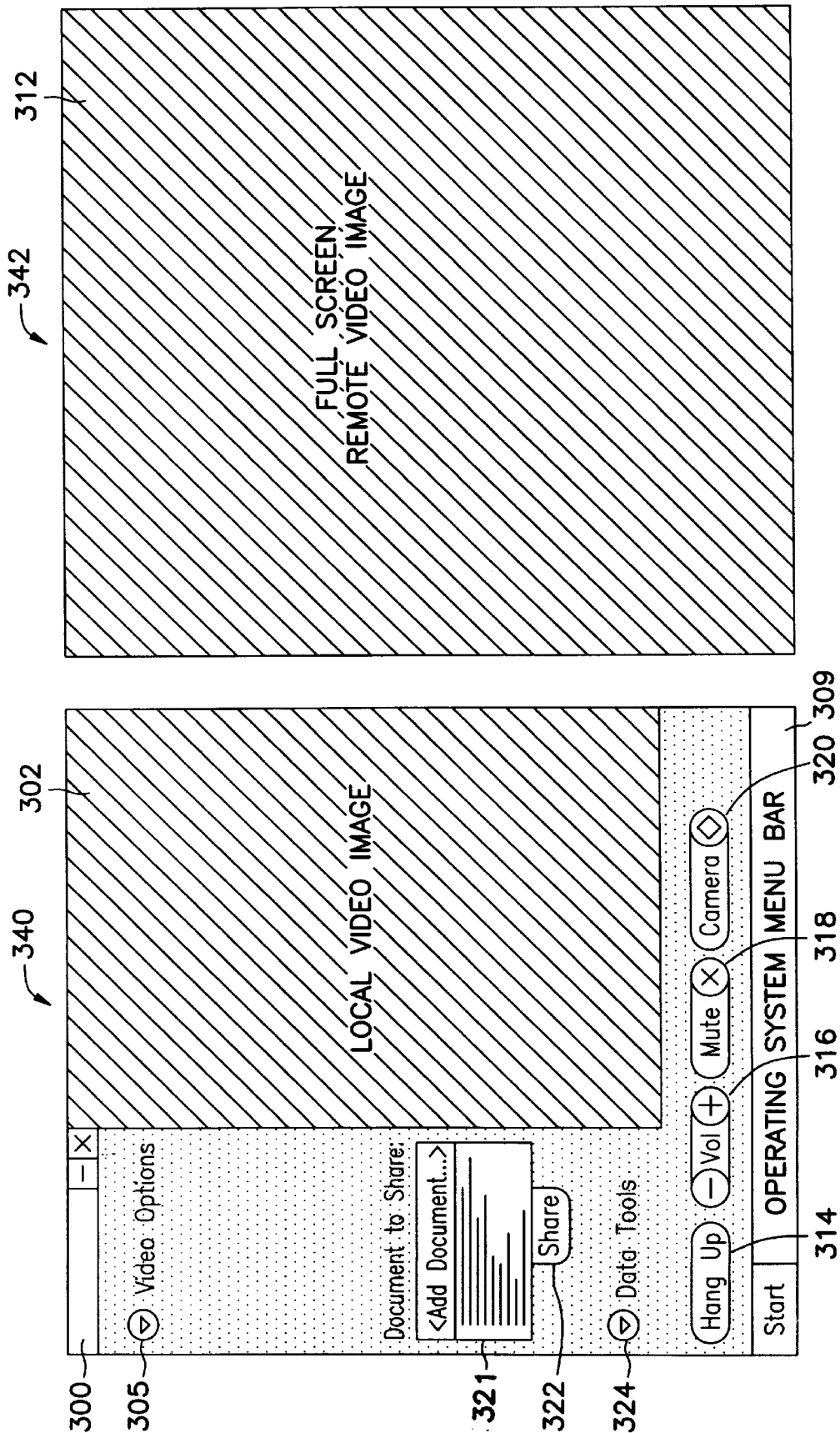
Figure 25:
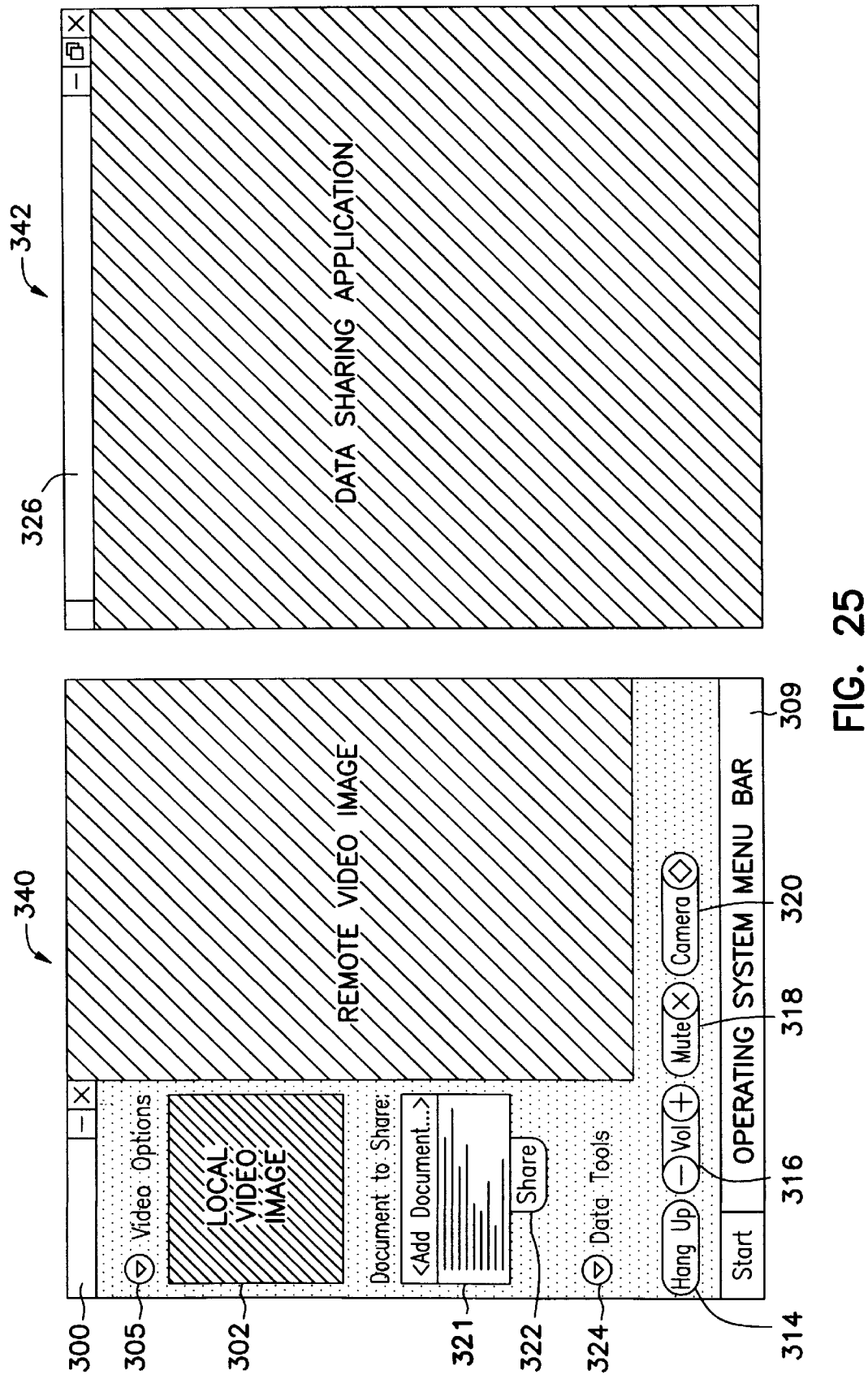
Figure 26:
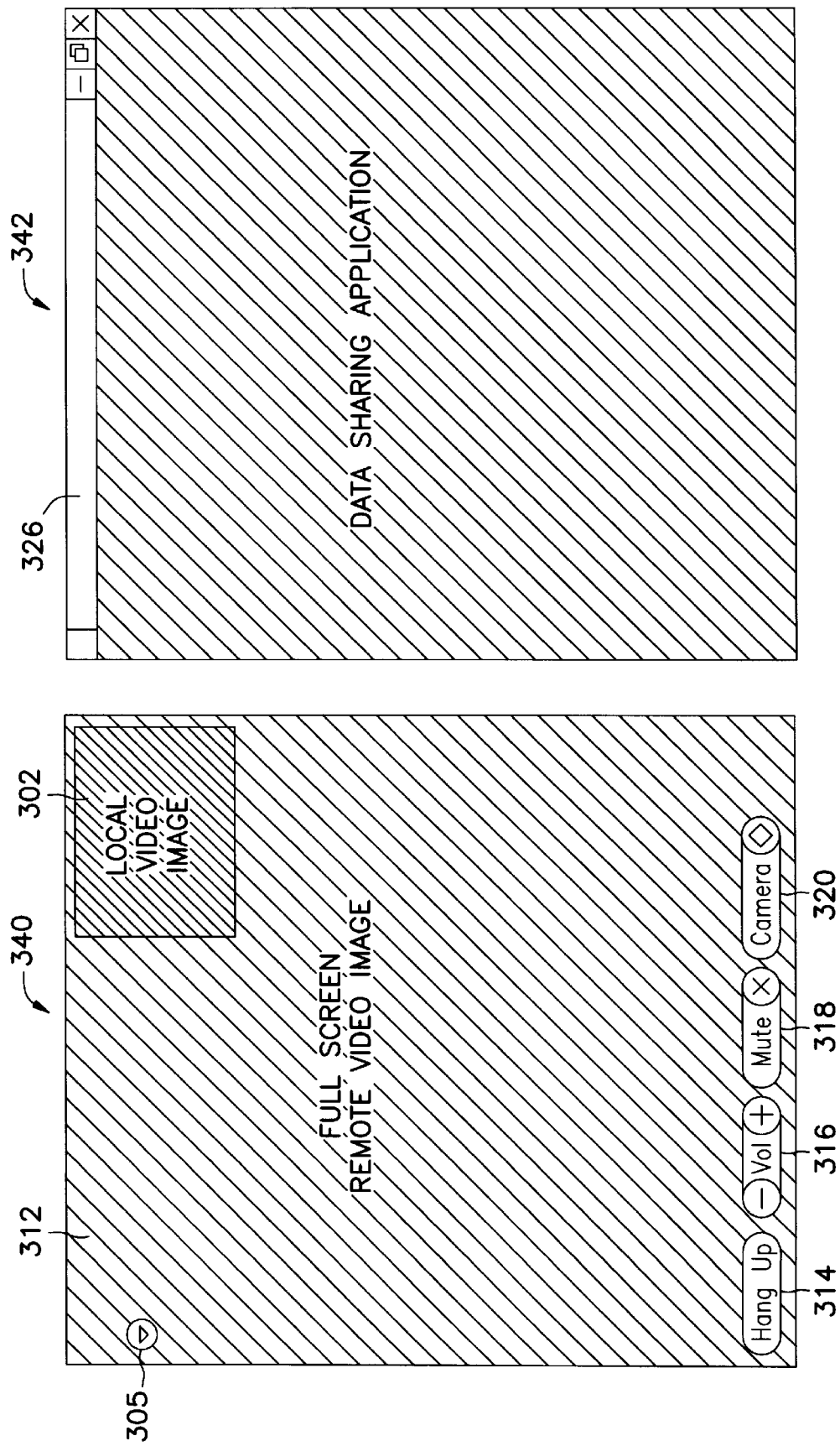
Figure 27:
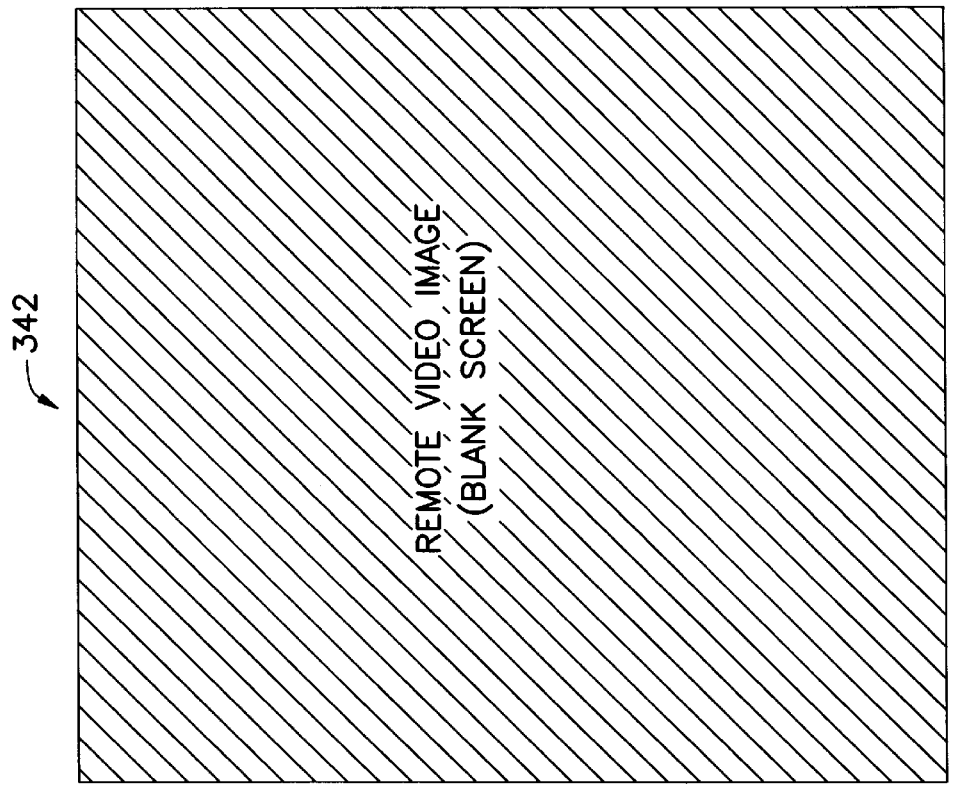
Figure 27:
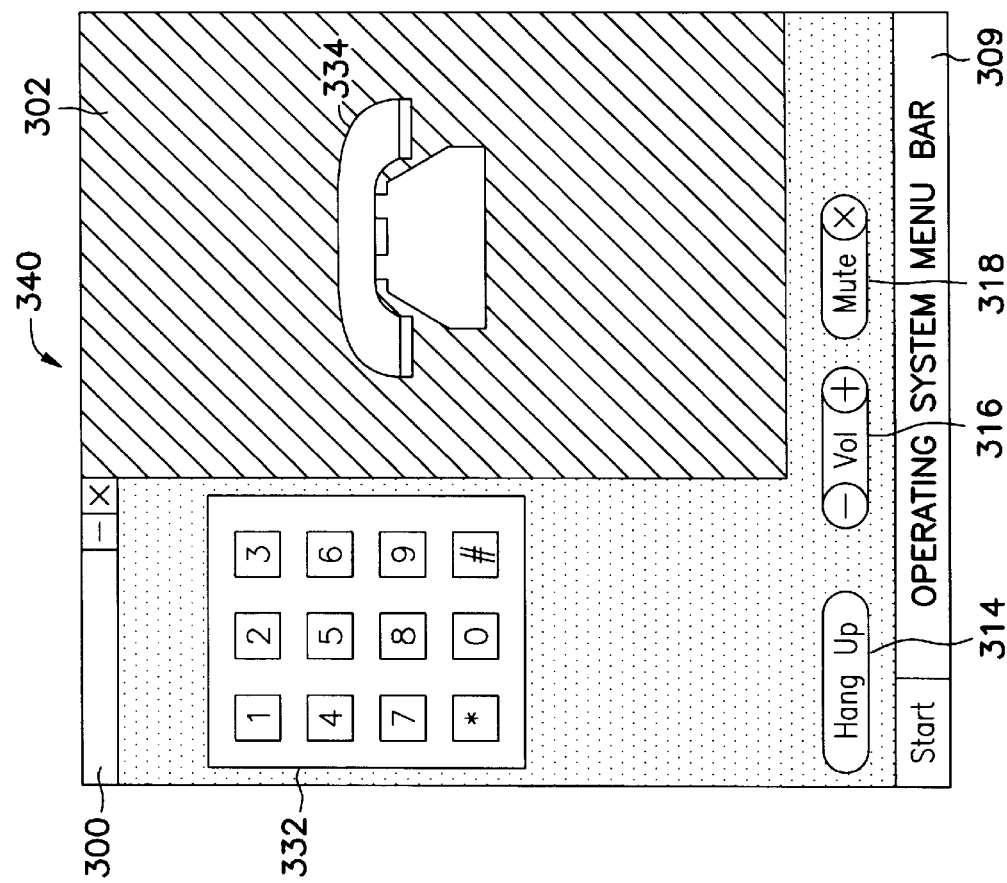

Referring now to FIG. 21, there is illustrated the Ready view according to this embodiment of the invention. This view is similar to the view illustrated in FIG. 5, with the second monitor display 342 blank. Referring now to FIG. 22, there is illustrated the Video Only view according to this embodiment of the invention. The local video image 302 remains displayed in the large video/application area. Referring now to FIG. 23 there is illustrated the Full-screen Video Only view, which is the same as the interface described with respect to FIG. 15. Referring now to FIG. 24, there is illustrated the Video with Data Not Shared view, which is the same as that of FIG. 16. Referring now to FIG. 25, there is illustrated the Data view according to this embodiment of the invention. In this view, the primary monitor 340 has the same user interface as is illustrated in FIG. 8, with the shared application 326 shown in the second monitor display 342. Referring now to FIG. 26, there is illustrated the Data view with Full-screen Video and a shared application. In this view, the local video image 302 is sized for the small video window (which may be moved by the user), while the remote video image 312 is displayed full screen on the primary monitor display 340. The shared application continues to be displayed full screen in the second monitor display 342. In the case of the primary monitor display 340, the Windows® Taskbar is hidden from view. The control buttons video options 305, hang up 314, volume 316, mute 318 and camera 320 are displayed on top of the full screen video. Referring now to FIG. 27, there is illustrated the Telephone Call view, which is similar to the view illustrated with respect to FIG. 20.

Referring now to FIGS. 28–33, there is illustrated yet another embodiment of the invention adapted for platforms with dual monitors. According to this embodiment, the primary monitor display 340 has standard PC or workstation functionality and the shared applications. The second monitor display 342 operates like the first described embodiment above (FIGS. 4–12) except that the shared applications appear in the first monitor display 340.

Figure 28:
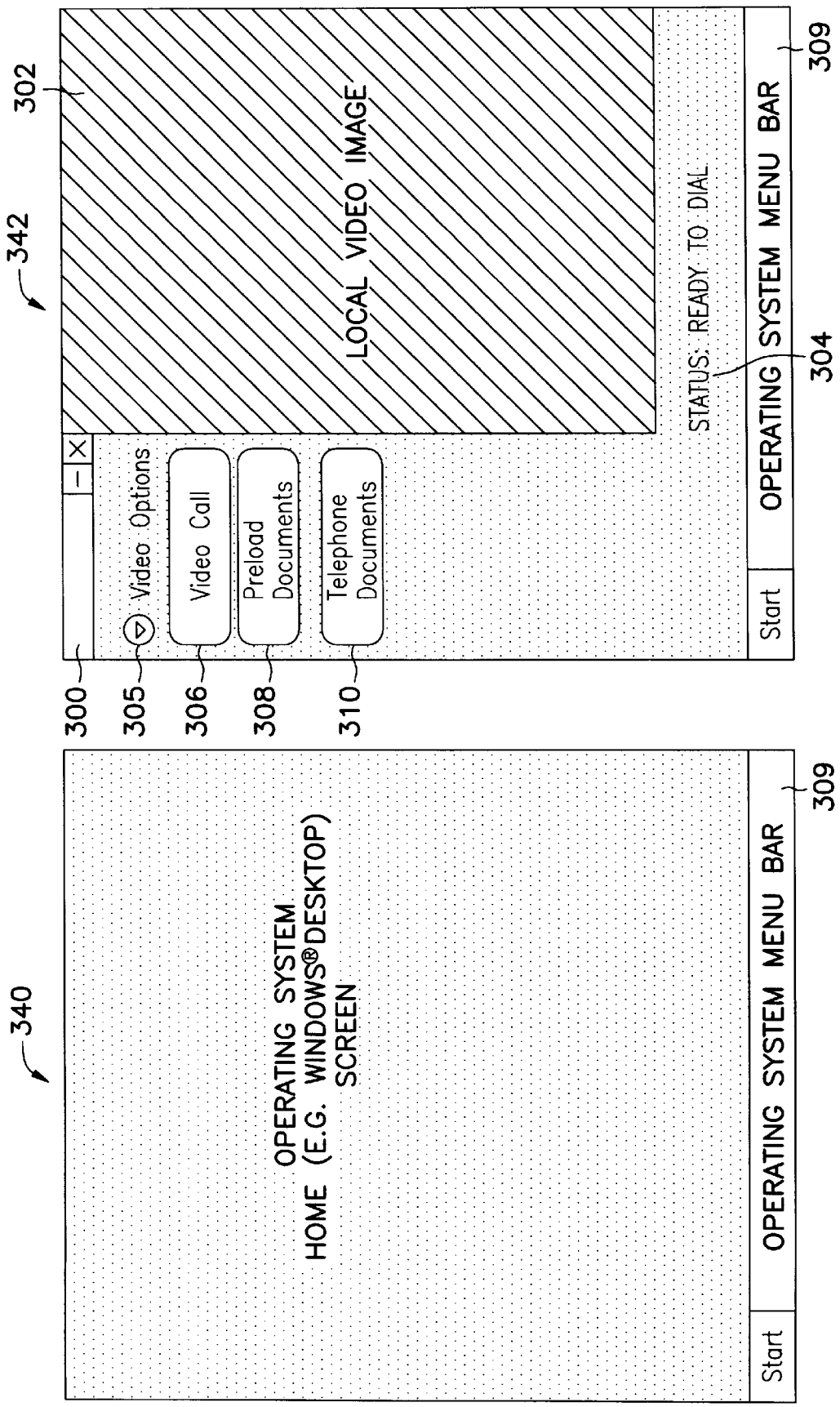
FIGS. 28–33 illustrate yet another example embodiment of the user interface according to the present invention.
Figure 29:
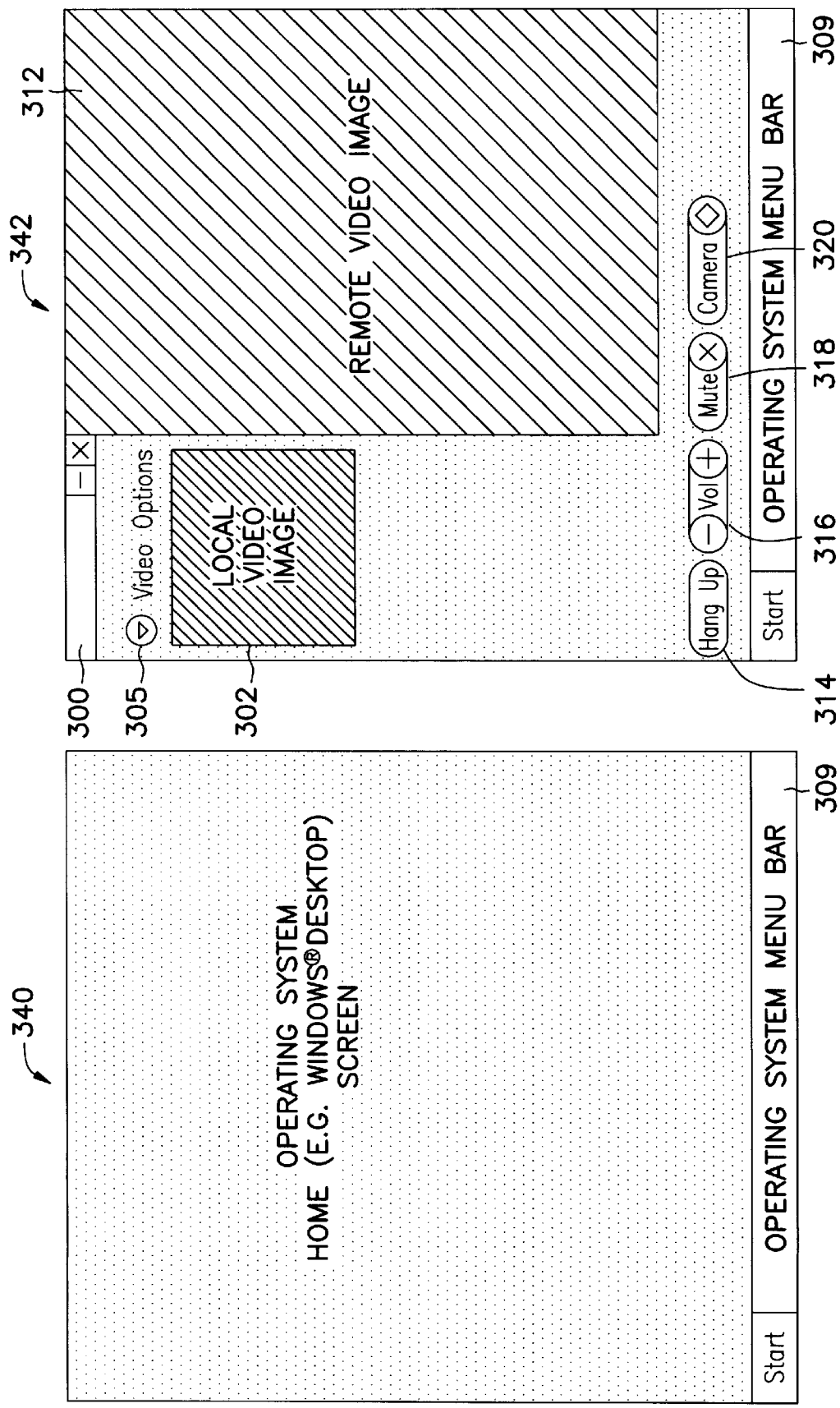
Figure 30:
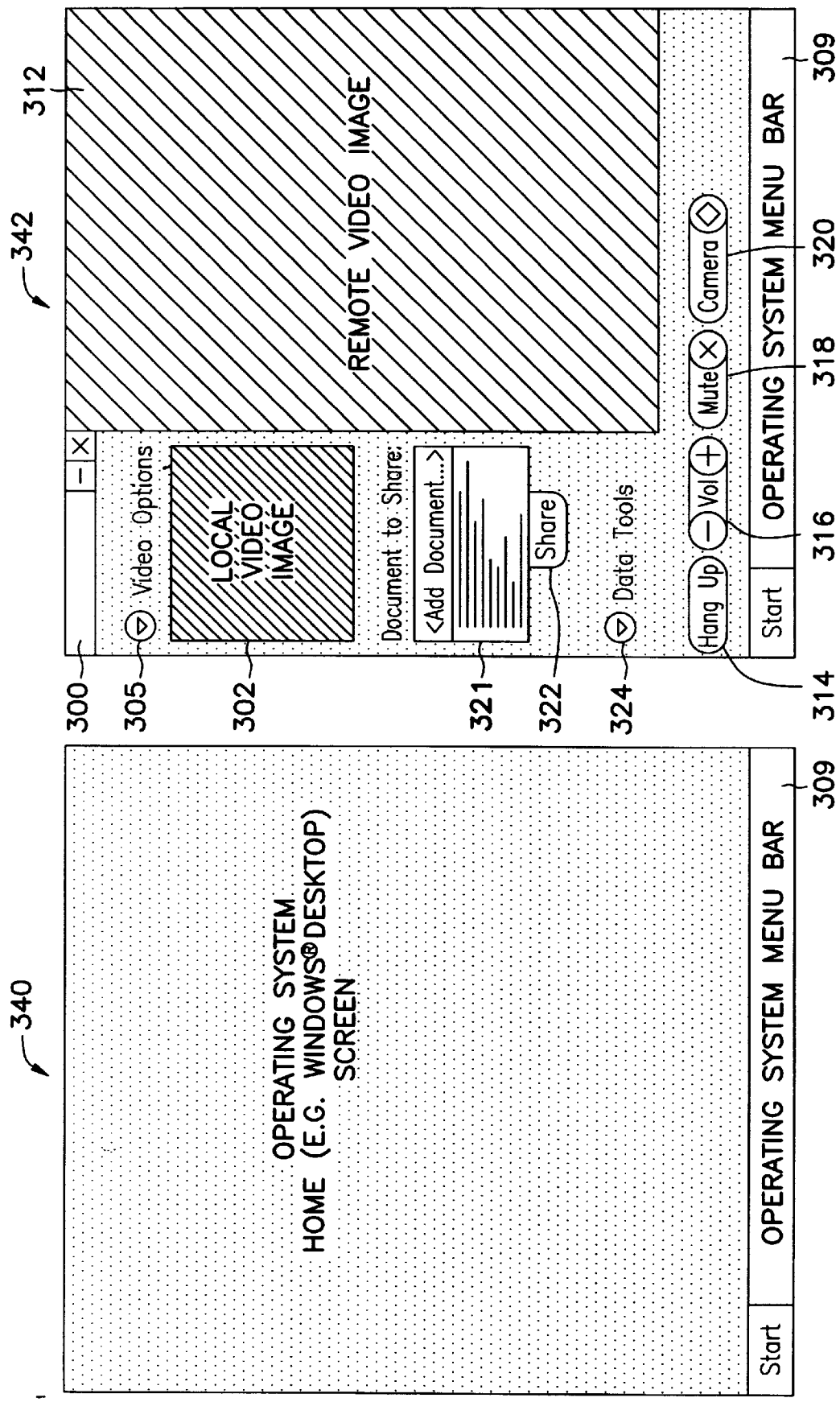
Figure 31:
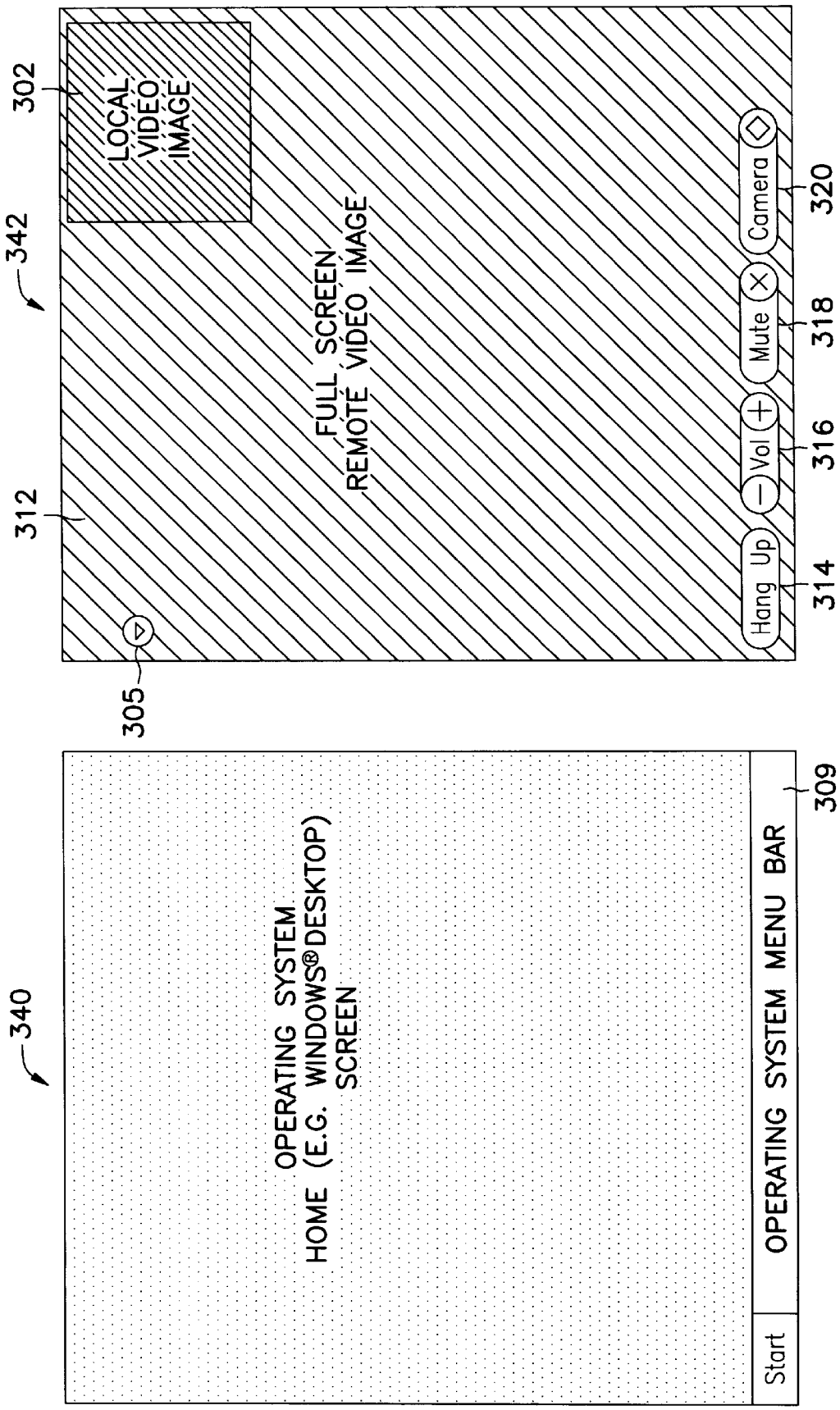
Figure 32:
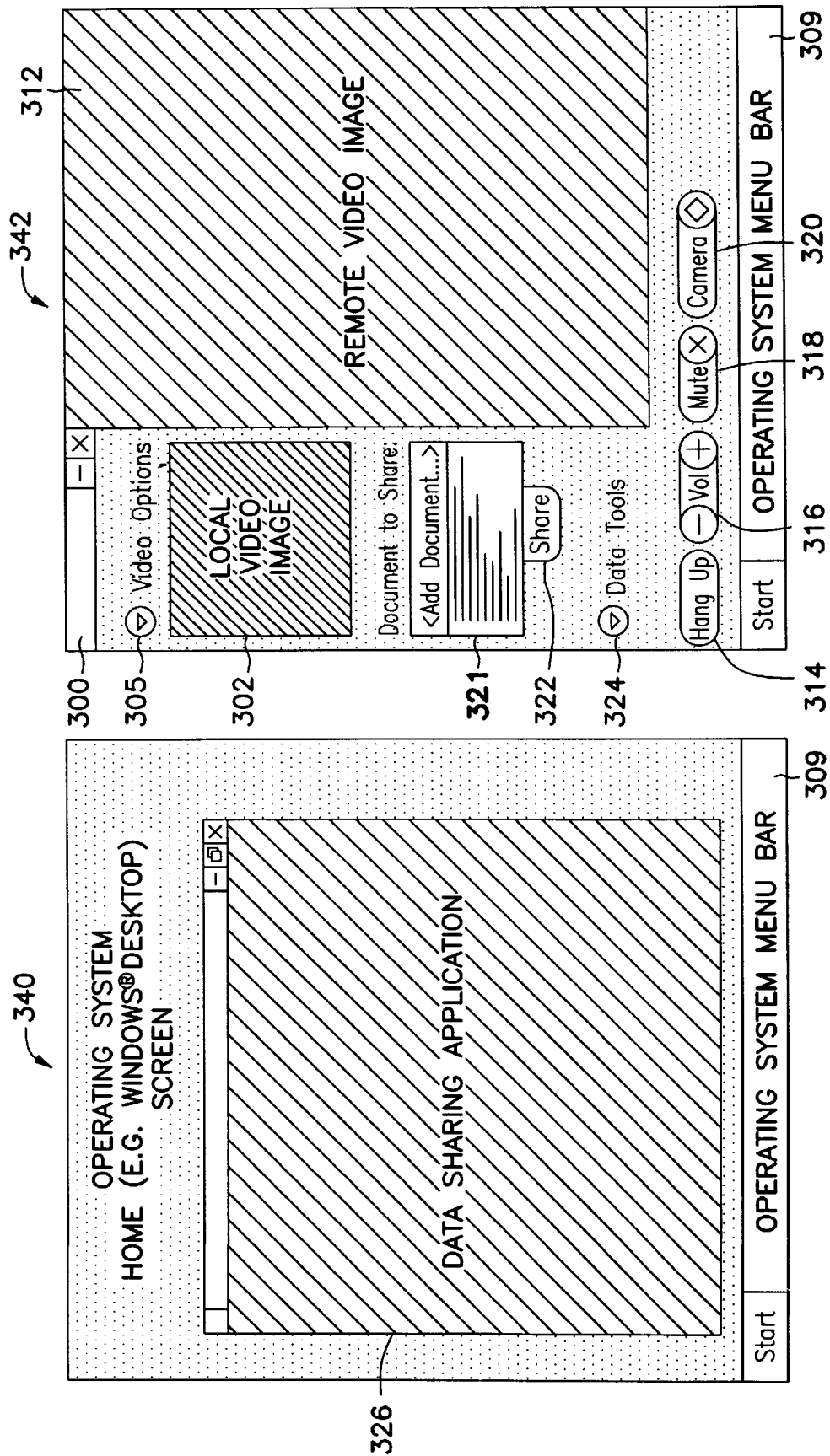
Figure 33:
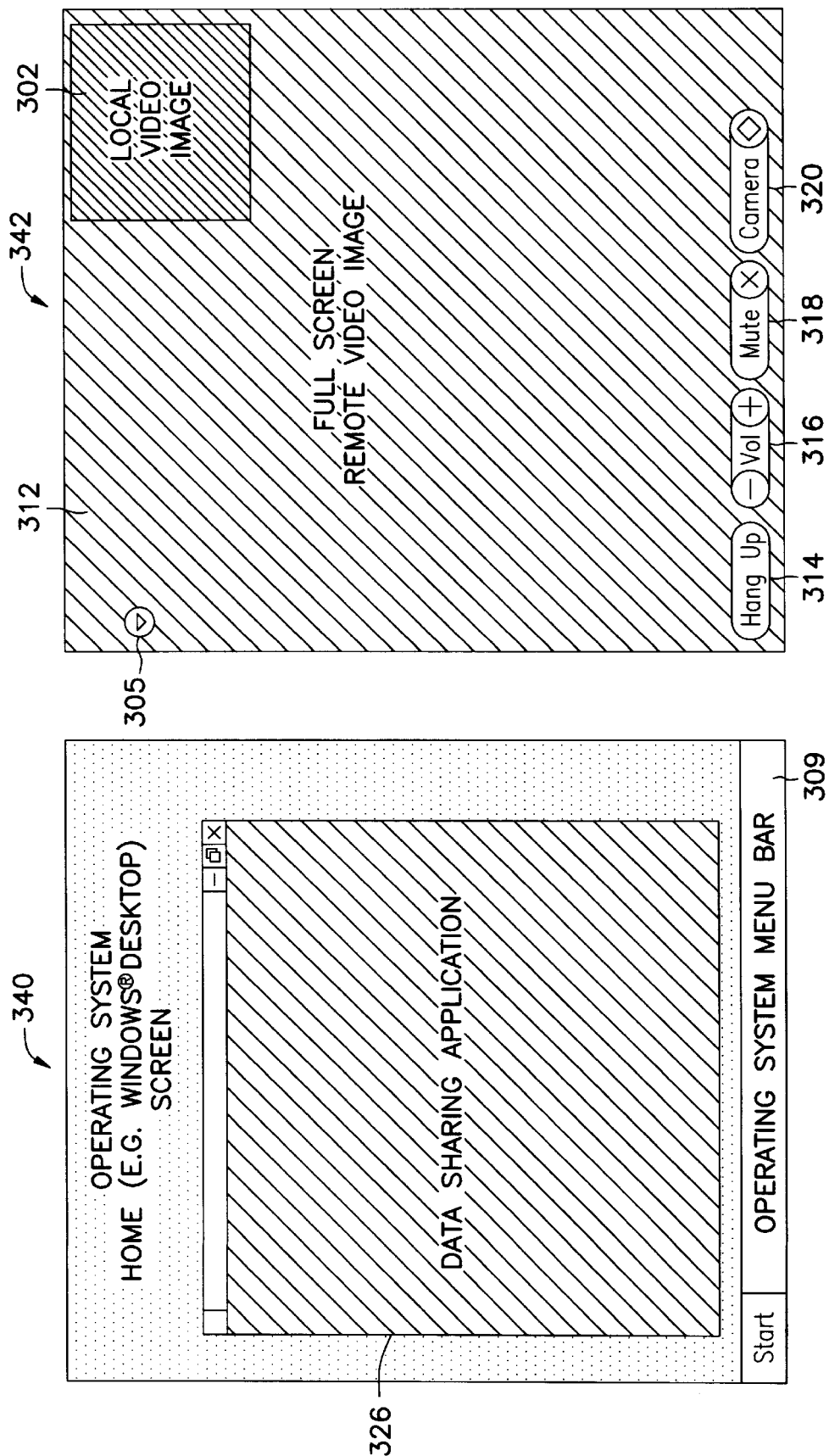

Referring now to FIG. 28, there is illustrated the Ready view according to this embodiment of the invention. This view is similar to the view illustrated in FIG. 5, with the Ready view displayed on the second monitor display 342, and the primary monitor display 340 unused by the video conferencing system. Referring now to FIG. 29, there is illustrated the Video Only view according to this embodiment of the invention. This view is the same as that of FIG. 6, displayed in the second monitor 342, and the primary monitor 340 unused. Referring now to FIG. 30 there is illustrated the Full-screen Video Only view. This view is the same as the view described with respect to FIG. 7, except it is displayed in the second monitor display 342. Referring now to FIG. 31, there is illustrated the Video Only view with document sharing options displayed in monitor display 342. Referring now to FIGS. 32, there is illustrated the Data view according to this embodiment of the invention. The second monitor display 342 remains in the same state as described above with respect to FIG. 31. However, a shared application 326 is now displayed on the primary monitor display 340. This application may be maximized to full screen. Referring now to FIG. 33, there is illustrated the Data view with Full-screen Video and a shared application. This view is the same as FIG. 32, except that the second monitor 342 includes a full screen video of the remote video image 312. Referring now to FIG. 34, there is illustrated the Telephone Call view. This view is similar to the view of FIG. 27.

In all the embodiments described above, when one or both of the video windows is hidden from view, the video stream associated with that window may be, if desired, paused to conserve CPU cycles. The video stream is also paused when the video windows are moved and/or sized allowing these actions to happen much faster than is possible if the video is playing.

Thus, the embodiments described above may reduce the technical challenges and time a user faces in having to manage their video and data application windows while also trying to hold an effective video conference. As illustrated, the system manages video conference related windows throughout the conference and outside the conference, based on simple menu choices made by the user. Although the invention has been described with respect to specific embodiments, it shall be understood that these embodiments are exemplary only, and that it is contemplated that the described methods and apparatus of the invention can be varied widely while still maintaining the advantages of the invention. Thus, the disclosure should not be taken as limiting in any way the scope of the invention. In addition, as used herein, the term "unit" shall refer to a digital device that may take the form of a hardwired circuit, software executing on a processor, or a combination of both.

We claim:

1. A method of displaying video in a video conferencing system with a near end and a remote end, both of said ends including first and second monitors, comprising:

during all modes of video conferencing, displaying remote end video in a first monitor; and displaying near end video and shared applications in a second monitor.

2. A method according to claim 1 further including in one mode of operation displaying a shared application in a first operating system window displayed in the second monitor, and near end video and control options in a second operating system window displayed in the second monitor.

3. A method according to claim 2 further including in another mode of operation using the full screen of the second monitor to display the shared application, and displaying near end video in an area on top of the shared application.

4. A method according to claim 3 further including in another mode of operation displaying the near end video full screen on the second monitor.

5. A method of displaying video in a video conferencing system with a near end and a remote end, both of said ends including first and second monitors, comprising:

in one mode of video conferencing, displaying remote end video in a first monitor and the near end video in a second monitor; and in another mode of operation, displaying near end and far end video in the second monitor, and shared applications in the first monitor.

6. A method according to claim 5 further including in the another mode of operation displaying the near end video, the far end video, and control options in an operating system window displayed in the first monitor.

7. A method according to claim 6 further including in still another mode of operation using the full screen of the first monitor to display far end video, and displaying near end video in an area on top of the far end video.

8. A method of displaying video in a video conferencing system with a near end and a remote end, both of said ends including first and second monitors, comprising:

in all modes of video conferencing, displaying near end, remote end, and control options in a first monitor; and displaying shared applications in a second monitor.

9. A method according to claim 8 further including the first monitor performing as the monitor for an operating system, wherein both non-shared and shared applications are displayed in operating system windows of the first monitor.

10. A video conferencing system with a near end and a remote end, both of said ends including first and second monitors comprising:

a display unit producing a video signal for displaying far end video on a first one of the monitors during all modes of operation of the system during a video conference; and the display unit producing a video signal for displaying near end video and shared applications on a second one of the monitors during operation of the system during the video conference.

11. A system according to claim 10 further including the display unit producing a video signal for displaying a shared application in a first operating system window displayed in the second one of the monitors, and near end video and control options in a second operating system window displayed in the second one of the monitors.

12. A system according to claim 11 further including the display unit, in another mode of operation, producing a video signal for displaying the shared application in the full screen of the second one of the monitors, and for displaying near end video in an area on top of the shared application.

13. A system according to claim 12 further including the display unit, in yet another mode of operation, producing a video signal for displaying the near end video on the full screen of the second one of the monitors.

14. A video conferencing system with a near end and a remote end, both of said ends including first and second monitors comprising:

a display unit operating in one mode of video conferencing to produce a video signal for displaying remote end video in a first monitor and the near end video in a second monitor; and the display unit operating in another mode of operation to produce a video signal for displaying near end and far end video in the second monitor, and shared applications in the first monitor.

15. A system according to claim 5 further including the display unit operating in the another mode of operation to produce a video signal for displaying the near end video, the far end video, and control options in an operating system window displayed in the first monitor.

16. A system according to claim 15 further including the display unit operating in still another mode of operation to produce a video signal for using the full screen of the first monitor to display far end video, and displaying near end video in an area on top of the far end video.

17. A video conferencing system with a near end and a remote end, both of said ends including first and second monitors comprising:

a display unit operative in all modes of video conferencing to produce a video signal for displaying near end, remote end, and control options in a first monitor; and the display unit producing a video signal for displaying shared applications in a second monitor.

18. A system according to claim 17 further including the display unit producing a video signal for displaying operating system interfaces in the second monitor.

19. A computer program product comprising computer code embodied in a computer readable medium, comprising:

the computer code operative on a computer and producing a video signal for displaying far end video on a first monitor during all modes of operation of the computer code during a video conference; and the computer code operative on a computer and producing a video signal for displaying near end video and shared applications on a second monitor during the video conference, wherein said first and second monitors located at the same site.

20. A computer program product comprising computer code embodied in a computer readable medium, comprising:

the computer code operative on a computer in one mode to produce a video signal for displaying remote end video in a first monitor and the near end video in a second monitor; and the computer code operative on a computer in another mode of operation to produce a video signal for displaying near end and far end video in the second monitor, and shared applications in the first monitor, wherein said first and second monitors located at the same site.

21. A computer program product comprising computer code embodied in a computer readable medium, comprising:

the computer code operative on a computer in all modes of operation to produce a video signal for displaying near end, remote end, and control options in a first monitor; and the computer code operative on a computer to produce a video signal for displaying shared applications in a second monitor, wherein said first and second monitors located at the same site.

* * * * *